US009459276B2

(12) United States Patent
Joseph

(10) Patent No.: US 9,459,276 B2
(45) Date of Patent: Oct. 4, 2016

(54) SYSTEM AND METHOD FOR DEVICE SELF-CALIBRATION

(71) Applicant: Sensor Platforms, Inc., Mountain View, CA (US)

(72) Inventor: Benjamin E. Joseph, Oakland, CA (US)

(73) Assignee: Sensor Platforms, Inc., Mountain View, CA (US)

( * ) Notice: Subject to any disclaimer, the term of this patent is extended or adjusted under 35 U.S.C. 154(b) by 0 days.

(21) Appl. No.: 13/734,694

(22) Filed: Jan. 4, 2013

(65) Prior Publication Data

US 2013/0174636 A1    Jul. 11, 2013

Related U.S. Application Data

(60) Provisional application No. 61/584,178, filed on Jan. 6, 2012.

(51) Int. Cl.
| | | |
|---|---|---|
| *G01P 21/00* | (2006.01) | |
| *G01C 25/00* | (2006.01) | |
| *G01C 17/38* | (2006.01) | |
| *G06F 3/033* | (2013.01) | |

(52) U.S. Cl.
CPC ............ *G01P 21/00* (2013.01); *G01C 17/38* (2013.01); *G01C 25/00* (2013.01); *G01C 25/005* (2013.01); *G06F 3/033* (2013.01)

(58) Field of Classification Search
CPC ... G01P 21/00; G01C 21/16; A63B 2220/40; A63B 2225/50; A63B 69/3614; B01F 13/0062; B01F 3/0807; B01L 2200/0689; B01L 2300/0816; B01L 2300/0819

USPC ................................ 73/1.41, 1.37; 702/141
See application file for complete search history.

(56) References Cited

U.S. PATENT DOCUMENTS

| | | | |
|---|---|---|---|
| 3,953,795 | A | 4/1976 | Brunner et al. |
| 4,263,494 | A | 4/1981 | Martin |
| 4,318,186 | A | 3/1982 | Wynn |
| 4,467,272 | A | 8/1984 | Hassler et al. |

(Continued)

FOREIGN PATENT DOCUMENTS

| | | |
|---|---|---|
| EP | 1762287 | 3/2007 |
| EP | 2120134 | 11/2009 |

(Continued)

OTHER PUBLICATIONS

International Search Report and Written Opinion for International Application No. PCT/US2009/060475 mailed May 18, 2010. 9 pages.

(Continued)

*Primary Examiner* — Eric S McCall
*Assistant Examiner* — Mohammed E Keramet-Amircolai
(74) *Attorney, Agent, or Firm* — Carr & Ferrell LLP

(57) ABSTRACT

A system, computer readable storage medium and method for calibrating sensors of a human interface device having a first accelerometer and a second accelerometer. The method includes calibrating the first accelerometer, calibrating the second accelerometer, and calibrating a combined-sensor output that includes contributions from the first accelerometer and the second accelerometer to generate combined-sensor conversion values. The method further includes adjusting the calibration of the first accelerometer in accordance with the combined-sensor conversion values.

21 Claims, 11 Drawing Sheets

(56) References Cited

U.S. PATENT DOCUMENTS

| | | | |
|---|---|---|---|
| 4,516,770 A | 5/1985 | Brookes et al. | |
| 4,641,246 A | 2/1987 | Halbert et al. | |
| 4,816,748 A | 3/1989 | Tazawa et al. | |
| 4,847,783 A | 7/1989 | Grace et al. | |
| 4,851,775 A | 7/1989 | Kim et al. | |
| 4,964,727 A * | 10/1990 | Huggins | G01D 5/34776 250/226 |
| 5,128,671 A | 7/1992 | Thomas, Jr. | |
| 5,161,311 A | 11/1992 | Esmer et al. | |
| 5,239,264 A | 8/1993 | Hawks | |
| 5,321,401 A | 6/1994 | White | |
| 5,637,994 A | 6/1997 | Carder | |
| 5,645,077 A | 7/1997 | Foxlin | |
| 5,757,360 A | 5/1998 | Nitta et al. | |
| 5,819,206 A | 10/1998 | Horton et al. | |
| 5,874,941 A | 2/1999 | Yamada | |
| 5,893,049 A | 4/1999 | Reggiardo | |
| 6,072,467 A | 6/2000 | Walker | |
| 6,157,894 A | 12/2000 | Hess et al. | |
| 6,176,837 B1 | 1/2001 | Foxlin | |
| 6,243,476 B1 | 6/2001 | Gardner | |
| 6,304,828 B1 | 10/2001 | Swanick et al. | |
| 6,384,596 B1 | 5/2002 | Beyer | |
| 6,593,956 B1 | 7/2003 | Potts et al. | |
| 6,882,086 B2 | 4/2005 | Kornbluh et al. | |
| 7,139,983 B2 | 11/2006 | Kelts | |
| 7,154,275 B2 | 12/2006 | Zank et al. | |
| 7,158,118 B2 | 1/2007 | Liberty | |
| 7,216,055 B1 | 5/2007 | Horton et al. | |
| 7,246,058 B2 | 7/2007 | Burnett | |
| 7,262,760 B2 | 8/2007 | Liberty | |
| 7,285,964 B1 | 10/2007 | Hsu et al. | |
| 7,296,363 B2 | 11/2007 | Danisch et al. | |
| 7,305,630 B2 | 12/2007 | Hullender et al. | |
| 7,307,411 B1 | 12/2007 | Hsu et al. | |
| 7,350,303 B2 | 4/2008 | Rock et al. | |
| 7,414,611 B2 | 8/2008 | Liberty | |
| 7,451,549 B1 | 11/2008 | Sodhi et al. | |
| 7,647,185 B2 | 1/2010 | Tarassenko et al. | |
| 7,815,508 B2 | 10/2010 | Dohta | |
| 7,844,415 B1 | 11/2010 | Bryant et al. | |
| 7,940,986 B2 | 5/2011 | Mekenkamp et al. | |
| 7,978,178 B2 | 7/2011 | Pehlivan et al. | |
| 8,184,100 B2 | 5/2012 | Lian et al. | |
| 8,201,200 B2 | 6/2012 | Imai | |
| 8,223,121 B2 | 7/2012 | Shaw et al. | |
| 8,515,707 B2 | 8/2013 | Joseph et al. | |
| 8,576,169 B2 | 11/2013 | Shaw et al. | |
| 8,577,677 B2 | 11/2013 | Kim et al. | |
| 8,587,519 B2 | 11/2013 | Shaw et al. | |
| 8,712,069 B1 | 4/2014 | Murgia et al. | |
| 8,787,587 B1 | 7/2014 | Murgia et al. | |
| 8,907,893 B2 | 12/2014 | Shaw et al. | |
| 8,957,909 B2 | 2/2015 | Joseph et al. | |
| 9,152,249 B2 | 10/2015 | Shaw et al. | |
| 9,228,842 B2 | 1/2016 | Joseph et al. | |
| 9,316,513 B2 | 4/2016 | Joseph et al. | |
| 2002/0120217 A1 | 8/2002 | Adapathya et al. | |
| 2002/0158815 A1 | 10/2002 | Zwern | |
| 2002/0169553 A1* | 11/2002 | Perlmutter | G01C 21/165 701/472 |
| 2003/0016835 A1 | 1/2003 | Elko et al. | |
| 2003/0018430 A1 | 1/2003 | Ladetto et al. | |
| 2003/0023192 A1 | 1/2003 | Foxlin | |
| 2003/0107888 A1 | 6/2003 | Devlin et al. | |
| 2003/0149907 A1 | 8/2003 | Singh et al. | |
| 2003/0164739 A1 | 9/2003 | Bae | |
| 2003/0169891 A1 | 9/2003 | Ryan et al. | |
| 2004/0052391 A1 | 3/2004 | Bren et al. | |
| 2004/0198463 A1 | 10/2004 | Knoedgen | |
| 2004/0199674 A1 | 10/2004 | Brinkhus | |
| 2005/0008169 A1 | 1/2005 | Muren et al. | |
| 2005/0229117 A1 | 10/2005 | Hullender et al. | |
| 2006/0033716 A1 | 2/2006 | Rosenberg et al. | |
| 2006/0164384 A1 | 7/2006 | Smith et al. | |
| 2006/0164386 A1 | 7/2006 | Smith et al. | |
| 2006/0195254 A1 | 8/2006 | Ladetto et al. | |
| 2006/0217977 A1 | 9/2006 | Gaeta et al. | |
| 2006/0250358 A1 | 11/2006 | Wroblewski | |
| 2007/0146319 A1 | 6/2007 | Masselle et al. | |
| 2007/0234779 A1 | 10/2007 | Hsu et al. | |
| 2007/0287911 A1 | 12/2007 | Haid et al. | |
| 2008/0072234 A1 | 3/2008 | Myroup | |
| 2008/0080789 A1 | 4/2008 | Marks et al. | |
| 2008/0140338 A1 | 6/2008 | No et al. | |
| 2008/0150891 A1 | 6/2008 | Berkley et al. | |
| 2008/0173717 A1 | 7/2008 | Antebi et al. | |
| 2008/0211768 A1 | 9/2008 | Breen et al. | |
| 2008/0281555 A1 | 11/2008 | Godin et al. | |
| 2008/0284729 A1 | 11/2008 | Kurtenbach et al. | |
| 2009/0009471 A1 | 1/2009 | Yamamoto et al. | |
| 2009/0040175 A1 | 2/2009 | Xu et al. | |
| 2009/0048021 A1 | 2/2009 | Lian et al. | |
| 2009/0055170 A1 | 2/2009 | Nagahama | |
| 2009/0153349 A1 | 6/2009 | Lin et al. | |
| 2009/0295722 A1 | 12/2009 | Yamamoto | |
| 2009/0326857 A1 | 12/2009 | Mathews et al. | |
| 2010/0039381 A1 | 2/2010 | Cretella, Jr. et al. | |
| 2010/0060573 A1 | 3/2010 | Moussavi | |
| 2010/0088061 A1* | 4/2010 | Horodezky | G06F 1/1624 702/141 |
| 2010/0095773 A1 | 4/2010 | Shaw et al. | |
| 2010/0097316 A1 | 4/2010 | Shaw et al. | |
| 2010/0110001 A1 | 5/2010 | Yamamoto | |
| 2010/0123605 A1 | 5/2010 | Wilson | |
| 2010/0123656 A1 | 5/2010 | Park et al. | |
| 2010/0128881 A1 | 5/2010 | Petit et al. | |
| 2010/0128894 A1 | 5/2010 | Petit et al. | |
| 2010/0149341 A1 | 6/2010 | Marks et al. | |
| 2010/0150404 A1 | 6/2010 | Marks et al. | |
| 2010/0156786 A1 | 6/2010 | Kabasawa et al. | |
| 2010/0157168 A1 | 6/2010 | Dunton et al. | |
| 2010/0174506 A1* | 7/2010 | Joseph | G01C 21/165 702/141 |
| 2010/0194879 A1 | 8/2010 | Pasveer et al. | |
| 2010/0302145 A1 | 12/2010 | Langridge et al. | |
| 2010/0315905 A1 | 12/2010 | Lee et al. | |
| 2011/0163947 A1 | 7/2011 | Shaw et al. | |
| 2011/0172918 A1 | 7/2011 | Tome | |
| 2011/0205156 A1 | 8/2011 | Gomez et al. | |
| 2011/0239026 A1 | 9/2011 | Kulik | |
| 2011/0241656 A1 | 10/2011 | Piemonte et al. | |
| 2011/0242361 A1 | 10/2011 | Kuwahara et al. | |
| 2012/0007713 A1* | 1/2012 | Nasiri | G06F 1/1694 340/5.81 |
| 2012/0011351 A1 | 1/2012 | Mundra et al. | |
| 2012/0058803 A1 | 3/2012 | Nicholson | |
| 2012/0086725 A1* | 4/2012 | Joseph | G06F 3/038 345/629 |
| 2012/0130667 A1* | 5/2012 | Fukushima | G01C 25/00 702/96 |
| 2012/0268249 A1 | 10/2012 | Kansal et al. | |
| 2013/0179108 A1 | 7/2013 | Joseph et al. | |
| 2013/0192333 A1* | 8/2013 | Tohta | G01P 21/00 73/1.37 |
| 2013/0253821 A1 | 9/2013 | Joseph et al. | |
| 2013/0253880 A1 | 9/2013 | Joseph et al. | |
| 2014/0055351 A1 | 2/2014 | Shaw et al. | |
| 2014/0139432 A1 | 5/2014 | Shaw et al. | |
| 2014/0149060 A1 | 5/2014 | Meduna et al. | |
| 2016/0026265 A1 | 1/2016 | Shaw et al. | |

FOREIGN PATENT DOCUMENTS

| | | |
|---|---|---|
| EP | 2120134 A1 | 11/2009 |
| EP | 2485119 | 8/2012 |
| EP | 2485119 A2 | 8/2012 |
| EP | 2579127 | 4/2013 |
| EP | 2579127 A1 | 4/2013 |
| WO | WO2004047011 | 6/2004 |
| WO | WO2005040991 | 5/2005 |
| WO | WO2005040991 A2 | 5/2005 |
| WO | WO2005108119 | 11/2005 |
| WO | WO2005108119 A2 | 11/2005 |

(56) References Cited

FOREIGN PATENT DOCUMENTS

| WO | WO2006054295 | | 5/2006 |
|---|---|---|---|
| WO | WO2006054295 | A1 | 5/2006 |
| WO | WO2006090197 | | 8/2006 |
| WO | WO2006090197 | A1 | 8/2006 |
| WO | WO2009093161 | | 7/2009 |
| WO | WO2009132920 | | 11/2009 |
| WO | WO2009156499 | | 12/2009 |
| WO | WO2010048000 | | 4/2010 |
| WO | WO2010048000 | A2 | 4/2010 |
| WO | WO2010080383 | | 7/2010 |
| WO | WO2010080383 | A1 | 7/2010 |
| WO | WO2011085017 | | 7/2011 |
| WO | WO2011109229 | | 9/2011 |
| WO | WO2011109229 | A1 | 9/2011 |
| WO | WO2012047494 | | 4/2012 |
| WO | WO2013104006 | | 7/2013 |
| WO | WO2013104006 | A2 | 7/2013 |
| WO | WO2013148585 | | 10/2013 |
| WO | WO2013148585 | A1 | 10/2013 |
| WO | WO2014085615 | A2 | 6/2014 |

OTHER PUBLICATIONS

International Search Report and Written Opinion for International Application No. PCT/US2009/067976 mailed May 3, 2010. 9 pages.
International Search Report and Written Opinion for International Application No. PCT/US2011/020242 mailed Apr. 12, 2011. 13 pages.
International Search Report and Written Opinion for International Application No. PCT/US2011/052185 mailed Jan. 31, 2012. 11 pages.
International Search Report and Written Opinion for International Application No. PCT/US2012/020365 mailed May 23, 2012. 10 pages.
International Search Report and Written Opinion for International Application No. PCT/US2013/033723 mailed Jul. 29, 2013.
Sedlak et al., "Automated Attitude Sensor Calibration: Progress and Plans," in Paper No. AIAA-2004-4854, AIAA/AAS Astrodynamics Specialist Conference, Aug. 2004, Providence, RI, vol. 2, No. 4 , 14 pages.
Written Opinion mailed Nov. 30, 2011 in Patent Cooperation Treaty Application No. PCT/US2009/060475, filed Oct. 13, 2009.
Ang, Wei Tech et al., "Kalman Filtering for Real-Time Orientation Tracking of Handheld Microsurgical Instrument," Proceedings of 2004 IEEE/RSJ International Conference on Intelligent Robots and Systems; Sep. 28-Oct. 2, 2004; Sendai, Japan, pp. 2574-2580.
International Search Report and Written Opinion mailed May 18, 2010 in Patent Cooperation Treaty Application No. PCT/US2009/060475, filed Oct. 13, 2009.
International Search Report and Written Opinion mailed May 3, 2010 in Patent Cooperation Treaty Application No. PCT/US2009/067976, filed Dec. 15, 2009.
Simon, D., "Kalman Filtering," Embedded Systems Programming, vol. 14, No. 6, Jun. 2001, pp. 72-79.
International Search Report and Written Opinion mailed Jan. 31, 2012 in Patent Cooperation Treaty Application No. PCT/US2011/052185.
Foxlin, E., "Inertial Head-Tracker Sensor Fusion by a Complementary Separate-Bias Filter," in Proceedings of the IEEE Virtual Reality Annual International Symposium, 1996, pp. 185-195.
Foxlin et al., "Miniature 6-DOF Inertial System for Tracking HMDs," in SPIE, vol. 3362, Helmet and Head—Mounted Displays, III, AeroSense 98, Orlando, FL, Apr. 13-14, 1998, pp. 1-15.
International Search Report and Written Opinion mailed Jul. 29, 2013 in Patent Cooperation Treaty Application No. PCT/US2013/033723, filed Mar. 25, 2013.
Sedlak, J. "Spinning Spacecraft Attitude Estimation Using Markley Variables: Filter Implementation and Results," NASA Goddard Space Flight Center CP-2005-212789, Greenbelt, MD (2005), 15 pages.
Luong-Van et al. "Covariance Profiling for an Adaptive Kalman Filter to Suppress Sensor Quantization Effects," 43rd IEEE Conference on Decision and Control, vol. 3, Dec. 14-17, 2004, pp. 2680-2685.
International Search Report and Written Opinion mailed Dec. 19, 2014 in Patent Cooperation Treaty Application No. PCT/US2013/072278 mailed Dec. 19, 2014.
Wang et al., "A Framework of Energy Efficient Mobile Sensing for Automatic User State Recognition," Proceedings of the 7th International Conference on Mobile Systems, Applications, and Services, MOBISYS '09, Jun. 2009, pp. 179-192.
Girod et al., "The Design and Implementation of a Self-Calibrating Distributed Acoustic Sensing Platform," SenSys 06, Nov. 1-3, 2006, 14 pages.
Kim et al., "Modeling and Calibration of a Multi-Spectral Imaging Sensor for In-Field Crop Nitrogen Assessment," Applied Engineering in Agriculture, vol. 22, No. 6, Sep. 2006, pp. 935-941.
Ramanathan et al., "Rapid Deployment with Confidence: Calibration and Fault Detection in Environmental Sensor Networks," Center for Embedded Networked Sensing, UCLA, Department of Civil and Environmental Engineering, MIT, Jul. 4, 2006, pp. 1-14.
Bychkovskiy, Vladimir Leonidovich, "Distributed In-Place Calibration in Sensor Networks," University of California Master of Science in Computer Science Thesis, 2003. 42 pages.
Sedlak et al., "Automated Attitude Sensor Calibration: Progress and Plans," in Paper No. AIAA-2004-4854, AIAA/AAS Astrodynamics Specialist Conference, Aug. 2004, Providence, RI, vol. 2, No. 4, 14 pages.
International Search Report and Written Opinion mailed Sep. 13, 2013 in Patent Cooperation Treaty Application No. PCT/US2013/020687, filed Jan. 8, 2013.
International Search Report and Written Opinion mailed Nov. 30, 2011 in Patent Cooperation Treaty Application No. PCT/US2009/060475, filed Oct. 13, 2009.

* cited by examiner

SYSTEM AND METHOD FOR DEVICE SELF-CALIBRATION

RELATED APPLICATIONS

This application claims the benefit of U.S. Provisional Application Ser. No. 61/584,178, filed Jan. 6, 2012, which application is incorporated by reference herein in its entirety.

TECHNICAL FIELD

The disclosed embodiments relate generally to calibrating sensors used for determination of a navigational state of a human interface device.

BACKGROUND

A human interface device (e.g., a mouse, a trackball, etc.) may be used to interact with objects within a user interface. Some applications may need to know the navigational state (e.g., attitude and/or position) of the human interface device while the device is moving. One such example is an application that interfaces with a human interface device that may be moved freely in space (e.g., in one, two, or three dimensions of displacement and one, two or three dimensions of rotation or attitude) to position a cursor in a user interface, adjust display of overlaid objects in an augmented reality application or select a portion of a virtual world for display to a user of the device. However, sensors such as magnetometers and accelerometers that are used to determine the navigational state of a human interface device frequently have non-ideal characteristics coming straight from the factory and additional non-ideal characteristics may be introduced when integrating the sensors into the human interface device. These non-ideal characteristics may cause the device to function poorly or malfunction entirely.

SUMMARY

While, compensating for these non-ideal characteristics by calibrating the sensors can substantially improve the performance of the device, conventional calibration techniques require additional steps during manufacturing where the device is positioned in precisely defined navigational states. These additional steps add to the complexity and cost of manufacturing the device. Accordingly, it would be highly desirable to provide a way to calibrate sensors in a human interface device in an effective and cost efficient manner.

Some embodiments provide a method for, at a device including a magnetometer and an accelerometer: calibrating the magnetometer, and for each of a plurality of sample orientations: generating a set of one or more calibrated magnetometer measurements via the magnetometer, and generating a set of one or more uncalibrated accelerometer measurements. The method further includes calibrating the accelerometer using respective calibrated magnetometer measurements and corresponding respective uncalibrated accelerometer measurements for one or more respective sample orientations of the plurality of sample orientations.

In some embodiments, calibrating the magnetometer comprises using a sphere fit technique to calibrate the magnetometer. In some embodiments, calibrating the magnetometer comprises performing magnetometer calibration operations after the magnetometer has been integrated into circuitry of the device. In some embodiments, calibrating the magnetometer comprises storing conversion values for converting uncalibrated magnetometer measurements to calibrated magnetometer measurements and generating a calibrated magnetometer measurement for a respective sample orientation comprises receiving a respective uncalibrated magnetometer measurement from the magnetometer while the device is in a respective sample orientation and converting the respective uncalibrated magnetometer measurement to a respective calibrated magnetometer measurement using the conversation values.

In some embodiments, calibrating the accelerometer comprises comparing a first estimated acceleration with a second estimated acceleration, the first estimated acceleration is determined based on actual accelerometer measurements from the accelerometer and the second estimated acceleration is determined based on an attitude of the device determined using a tri-axial attitude determination. In some embodiments, calibrating the accelerometer comprises using respective calibrated magnetometer measurements and uncalibrated accelerometer measurements for three or more sample orientations. In some embodiments, the device is positioned in a series of sample orientations with at least a minimum spatial diversity and, optionally, the device is positioned in each sample orientation for at least a predefined threshold amount of time.

Some embodiments provide a method for, at a device including a first accelerometer and a second accelerometer: calibrating the first accelerometer and calibrating the second accelerometer. The method further includes calibrating a combined-sensor output to generate combined-sensor conversion values for converting uncalibrated combined-sensor measurements of the combined-sensor output to calibrated combined-sensor measurements of the combined-sensor output. The combined-sensor output includes contributions from the first accelerometer and the second accelerometer. The method also includes adjusting the calibration of the first accelerometer in accordance with the combined-sensor conversion values. In some embodiments, the combined-sensor output is based on a difference between measurements of the first accelerometer and measurements of the second accelerometer.

In some embodiments, calibrating the first accelerometer includes storing first-accelerometer conversion values for converting uncalibrated accelerometer measurements of the first accelerometer to calibrated accelerometer measurements of the first accelerometer. In some embodiments, calibrating the second accelerometer includes storing second-accelerometer conversion values for converting uncalibrated accelerometer measurements of the second accelerometer to calibrated accelerometer measurements of the second accelerometer. In some embodiments, calibrating the first accelerometer includes calibrating scale and/or offset of the first accelerometer and adjusting the calibration of the first accelerometer includes adjusting the calibration of skew and/or rotation of the first accelerometer.

In some embodiments, the method further includes adjusting the calibration of the second accelerometer in accordance with the calibrated combined-sensor output. In some embodiments, calibrating the second accelerometer includes calibrating scale and/or offset of the second accelerometer and adjusting the calibration of the second accelerometer includes adjusting the calibration of skew and/or rotation of the second accelerometer. In some embodiments, adjusting the calibration of the first accelerometer includes adjusting a respective first-accelerometer conversion value in accordance with a particular combined-sensor conversion value and adjusting the calibration of the second accelerometer includes adjusting a respective second-accelerometer conversion value that corresponds to the respective first-accelerometer conversation value in accordance with the particular combined-sensor conversion value. In some embodiments, the operations of calibrating the first accelerometer, calibrating the second accelerometer and calibrating the combined sensor output are performed using sensor measurements from a same plurality of sample orientations.

In accordance with some embodiments, a computer system (e.g., a human interface device or a host computer system) includes one or more processors, memory, and one or more programs; the one or more programs are stored in the memory and configured to be executed by the one or more processors and the one or more programs include instructions for performing the operations of any of the methods described above. In accordance with some embodiments, a non-transitory computer readable storage medium (e.g., for use by a human interface device or a host computer system) has stored therein instructions which when executed by one or more processors, cause a computer system (e.g., a human interface device or a host computer system) to perform the operations of any of the methods described above.

BRIEF DESCRIPTION OF THE DRAWINGS

Like reference numerals refer to corresponding parts throughout the drawings.

DESCRIPTION OF EMBODIMENTS

Exemplary Use Cases

Human interface devices that have a determinable multi-dimensional navigational state (e.g., one or more dimensions of displacement and/or one or more dimensions of rotation or attitude) are becoming increasingly common for providing user input for many different types of user interfaces. For example, such a human interface device may be used as a multi-dimensional pointer to control a pointer (e.g., a cursor) on a display of a personal computer, television, gaming system, etc. As another example, such a human interface device may be used to provide augmented reality views (e.g., by overlaying computer generated elements over a display of a view of the real world) that change in accordance with the navigational state of the human interface device so as to match up with a view of the real world that is detected on a camera attached to the human interface device. As yet another example, such a human interface device may be used to provide views of a virtual world (e.g., views of portions of a video game, computer generated simulation, etc.) that change in accordance with the navigational state of the human interface device so as to match up with a virtual viewpoint of the user based on the orientation of the device. In this document, the terms orientation, attitude and rotation are used interchangeably to refer to the orientation of a device or object with respect to a frame of reference.

In order to function properly (e.g., return results to the user that correspond to movements of the human interface device in predictable ways), these applications rely on well calibrated sensors that provide a consistent and accurate mapping between the sensor outputs and the navigational state of the human interface device. While specific use cases are described above and will be used to illustrate the general concepts described below, it should be understood that these examples are non-limiting examples and that the embodiments described herein would apply in an analogous manner to any human interface device that would benefit from calibrated sensors.

System Overview

Figure 1:
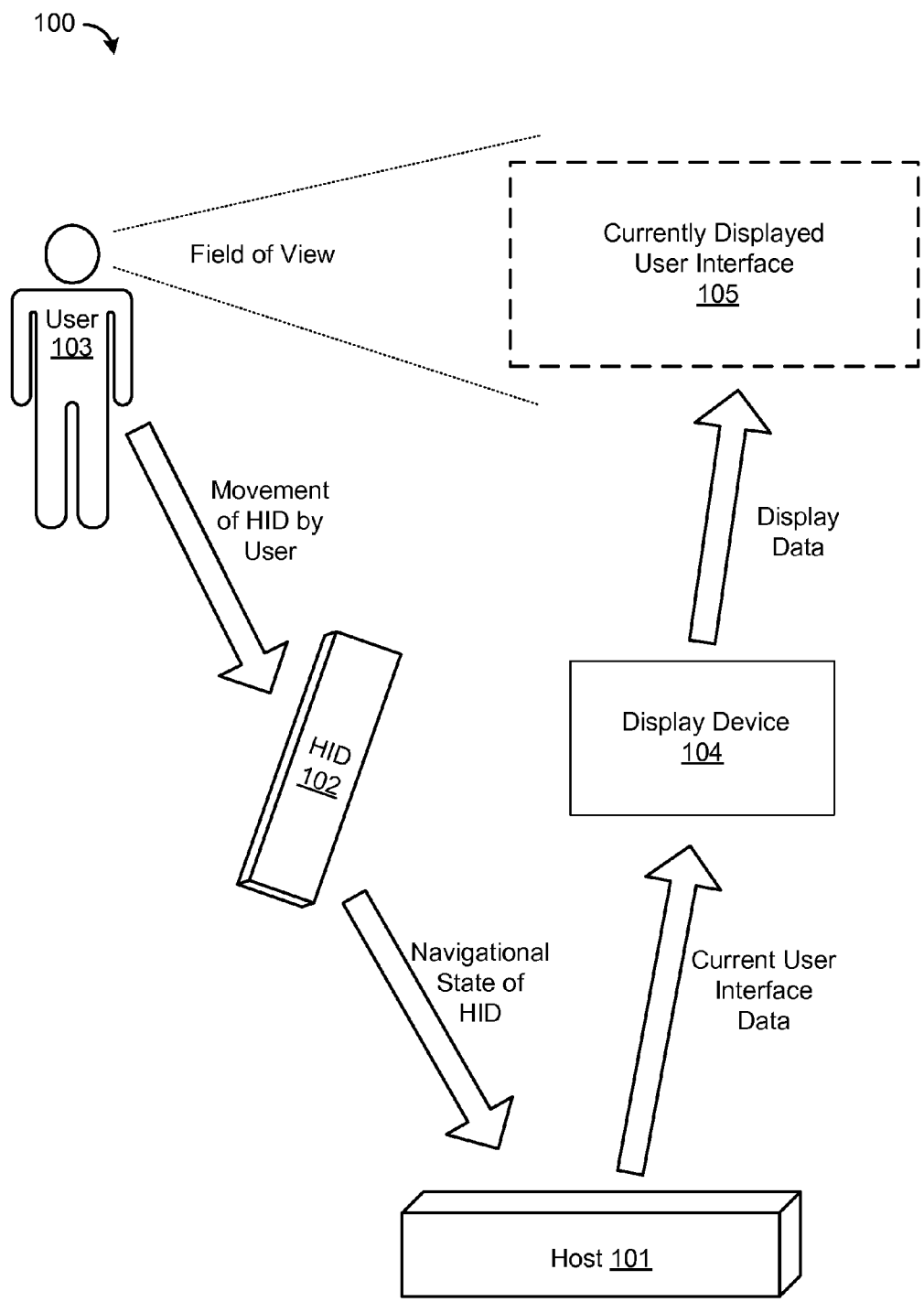
FIG. 1 illustrates a system for using a human interface device to manipulate a user interface, according to some embodiments.

Attention is now directed to FIG. 1, which illustrates an example system 100 for using a human interface device to manipulate a user interface. As shown in FIG. 1, an example Human Interface Device 102 (hereinafter "Device 102") is coupled to a Host Computer System 101 (hereinafter "Host 101") through a wireless interface, according to some embodiments. In these embodiments, a User 103 moves Device 102. These movements are detected by sensors in Device 102, as described in greater detail below with reference to FIG. 2. Device 102, or Host 101, generates a navigational state of Device 102 based on sensor measurements from the sensors and transmits the navigational state to Host 101. Host 101 generates current user interface data based on the navigational state of Device 102 and transmits the current user interface data to Display 104 (e.g., a display or a projector), which generates display data which is displayed to the user as the currently displayed User Interface 105. While Device 102, Host 101 and Display 104 are shown in FIG. 1 as being separate, in some embodiments the functions of one or more of these elements are combined or rearranged, as described in greater detail below with reference to FIGS. 3A-3E.

Thus, the user can use Device 102 to issue commands for modifying the user interface, control objects in the user interface, and/or position objects in the user interface by moving Device 102 so as to change its navigational state. In some embodiments, Device 102 is sensitive to six degrees of freedom: displacement along the x-axis, displacement along the y-axis, displacement along the z-axis, yaw, pitch, and roll.

In some embodiments, the wireless interface is selected from the group consisting of: a Wi-Fi interface, a Bluetooth interface, an infrared interface, an audio interface, a visible light interface, a radio frequency (RF) interface, and any combination of the aforementioned wireless interfaces. In some embodiments, the wireless interface is a unidirectional wireless interface from Device 102 to Host 101. In some embodiments, the wireless interface is a bidirectional wireless interface. In some embodiments, bidirectional communication is used to perform handshaking and pairing operations. In some embodiments, a wired interface is used instead of or in addition to a wireless interface. As with the wireless interface, the wired interface may be a unidirectional or bidirectional wired interface.

In some embodiments, data corresponding to a navigational state of Device 102 (e.g., raw measurements, calculated attitude, correction factors, position information, etc.) is transmitted from Device 102 and received and processed on Host 101 (e.g., by a host side device driver). Host 101 uses this data to generate current user interface data (e.g., specifying a position of a cursor and/or other objects in a user interface).

Figure 2:
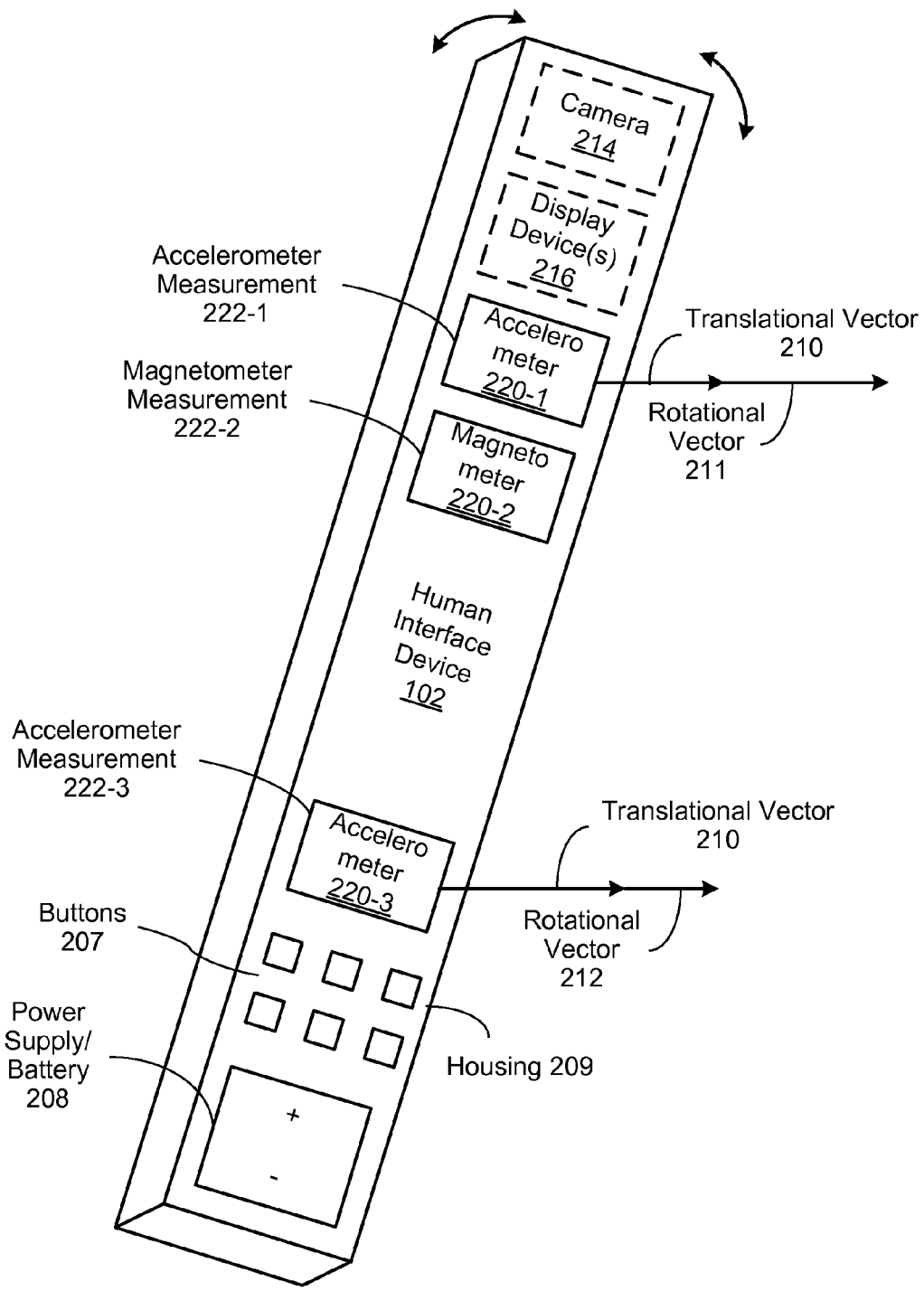
FIG. 2 is a block diagram illustrating an example human interface device, according to some embodiments.

Attention is now directed to FIG. 2, which illustrates an example of Device 102, according to some embodiments. In accordance with some embodiments, Device 102 includes one or more Sensors 220 (e.g., two multi-dimensional Accelerometers 220-1 and 220-3 and a multi-dimensional Magnetometer 220-2) which produce Sensor Outputs 222, which can be used to determine a navigational state of Device 102. In some embodiments, Device 102 also includes Buttons 207, Power Supply/Battery 208, Camera 214 and/or Display 216 (e.g., a display or projector). In some embodiments, Device 102 also includes one or more of the following additional user interface components: one or more processors, memory, a keypad, one or more thumb wheels, one or more light-emitting diodes (LEDs), an audio speaker, an audio microphone, a liquid crystal display (LCD), etc. In some embodiments, the various components of Device 102 (e.g., Sensors 220, Buttons 207, Power Supply 208, Camera 214 and Display 216) are all enclosed in Housing 209 of Device 102.

In some embodiments, the one or more processors (e.g., 1102, FIG. 8) of Device 102 perform one or more of the following operations: sampling Sensor Measurements 222, at a respective sampling rate, produced by Sensors 220; processing sampled data to determine displacement; transmitting displacement information to Host 101; monitoring the battery voltage and alerting Host 101 when the charge of Battery 208 is low; monitoring other user input devices (e.g., keypads, buttons, etc.), if any, on Device 102 and, as appropriate, transmitting information identifying user input device events (e.g., button presses) to Host 101; continuously or periodically running background processes to maintain or update calibration of Sensors 220; providing feedback to the user as needed on the remote (e.g., via LEDs, etc.); and recognizing gestures performed by user movement of Device 102.

Attention is now directed to FIGS. 3A-3E, which illustrate configurations of various components of the system for using a human interface device to manipulate a user interface. In some embodiments, there are three fundamental components to the system for using a human interface device to manipulate a user interface described herein: Sensors 220, which provide sensor measurements that are used to determine a navigational state of Device 102, User Interface Module 322 which uses the navigational state of Device 102 to determine current user interface data, and Display 104, which displays the currently displayed user interface to the user of Device 102. It should be understood that these components can be distributed among any number of different devices.

Figure 3A:
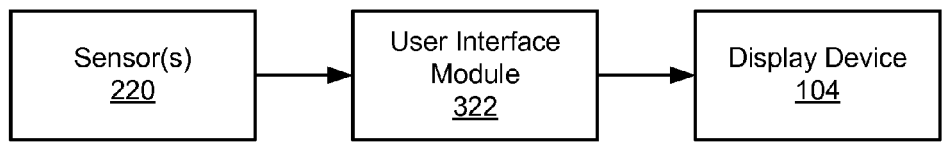
FIGS. 3A-3E are block diagrams illustrating configurations of various components of the system including a human interface device, according to some embodiments.
Figure 3B:
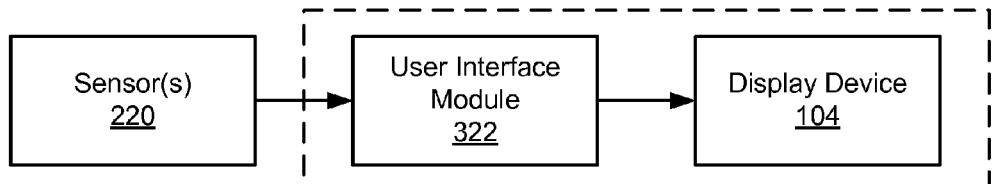
Figure 3C:
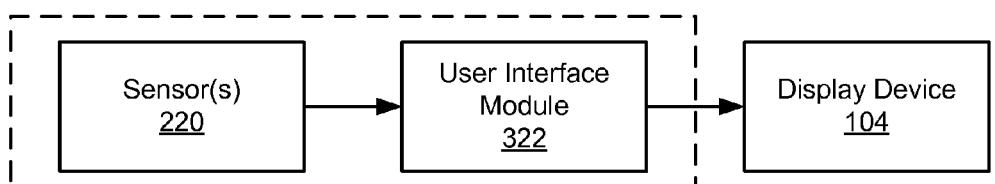
Figure 3D:
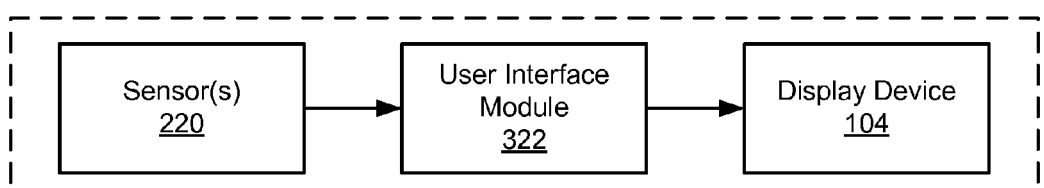
Figure 3E:
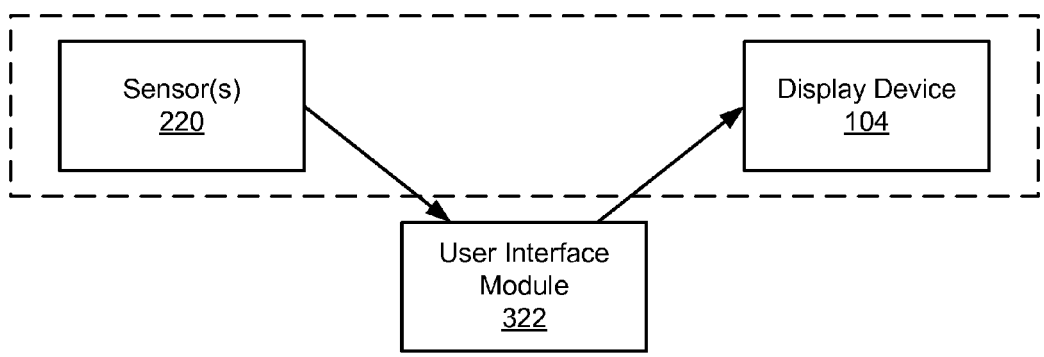

As one example, in FIG. 3A, Sensors 220, User Interface Module 322 and Display 104 are distributed between three different devices (e.g., a human interface device, a set top box, and a television, respectively). As another example, in FIG. 3B, Sensors 220 are included in a first device (e.g., a human interface device), while the user interface module 322 and Display 104 are included in a second device (e.g., a host with an integrated display). As another example, in FIG. 3C, Sensors 220 and User Interface Module 322 are included in a first device (e.g., a "smart" human interface device), while Display 104 is included in a second device (e.g., a television). As yet another example, in FIG. 3D, Sensors 220, User Interface Module 322 and Display 104 are included in a single device (e.g., a mobile computing device, such as a smart phone, personal digital assistant, tablet computer, etc., with an augmented reality application). As a final example, in FIG. 3E, Sensors 220 and Display 104 are included in a first device (e.g., a game controller with a display/projector), while User Interface Module 322 is included in a second device (e.g., a game console/server). It should be understood that in the example shown in FIG. 3E, the first device will typically be a portable device with limited processing power, while the second device is a device (e.g., a host computer system) with the capability to perform more complex processing operations, or to perform processing operations at greater speed, and thus the computationally intensive calculations are offloaded from the portable device to the device with greater processing power. While a plurality of common examples have been described above, it should be understood that the embodiments described herein are not limited to the examples described above, and other distributions of the various components could be made without departing from the scope of the described embodiments.

Sensor Calibration

One goal of sensor calibration is to improve the accuracy of sensor measurements from the uncalibrated sensors, which produce "raw" sensor measurements. In some embodiments, calibration is accomplished by determining a set of conversion values that can be used to compensate for error in raw sensor measurements. The error can be modeled as an affine transformation (linear matrix transformation plus offset term), and the goal of calibration is to compute the inverse of the modeled affine transformation; the inverse of the modeled affine transformation is sometimes called a calibration transformation, which is another affine transformation. This calibration transformation includes matrix D (Equation 1) which accounts for error in skew, scale and rotation distortions and an offset ($\vec{b}$). In Equation 1, the raw sensor output ("$\vec{y}_{raw}$") is the distorted measurement data that the sensor actually measures, and the calibrated sensor output ("$\vec{y}_{calibrated}$") comes from the application of the calibration transformation to the raw sensor output. This calibrated sensor output is then available for use by other algorithms. In some embodiments, navigational state determination algorithms determine the navigational state of the device based on the calibrated sensor output. For a three dimensional sensor, D is a 3×3 matrix and $\vec{b}$ is a 3 component vector. For a two dimensional sensor, D is a 2×2 matrix and $\vec{b}$ is a 2 component vector. For a single dimensional sensor, D and $\vec{b}$ are both scalar values.

$$\vec{y}_{calibrated} = (I+D)\vec{y}_{raw} + \vec{b} \quad (1)$$

In some circumstances it is beneficial to separate the rotation from the skew and scale components of the conversion values. For example, the D matrix can be decomposed via polar decomposition to a symmetric matrix (I+S) where I is the identity matrix, S is a matrix that defines scale and skew conversion values and R is an orthonormal rotation matrix, as shown in Equations 2 and 3 below.

$$(I + D) = R(I + S) \quad (2)$$

$$S = \begin{pmatrix} ScaleX & SkewXY & SkewXZ \\ SkewXY & ScaleY & SkewYZ \\ SkewXZ & SkewYZ & ScaleZ \end{pmatrix} \quad (3)$$

In all, in this example, there are twelve conversion values to estimate for each sensor, three offset values, three scale values, three skew values, and three rotation values (as Euler angles). Thus, R is a function of three values (rotation values) and S is a function of six values (three scale values and three skew values).

Many devices use MEMS (Microelectromechanical system) sensors due to the attractive price/performance characteristics of MEMS sensors. In particular MEMS sensors are typically relatively inexpensive and, when properly calibrated, provide sensor measurements that are sufficiently accurate for most commercial applications in consumer electronic devices such as cell phones, cameras and game controllers. Calibration of a MEMS sensor typically required collecting sensor measurements having sufficient measurement diversity in the measurement space for the MEMS sensor. For example, for an accelerometer or a magnetometer the measurement space is orientation based and thus measurement diversity for an accelerometer or magnetometer means collecting sensor values from the accelerometer or magnetometer to a plurality of different device orientations. In contrast, for a gyroscope, the measurement space is movement based, and thus measurement diversity for a gyroscope means collecting sensor values from the gyroscope while Device 102 is rotating about different axes.

Figure 4:
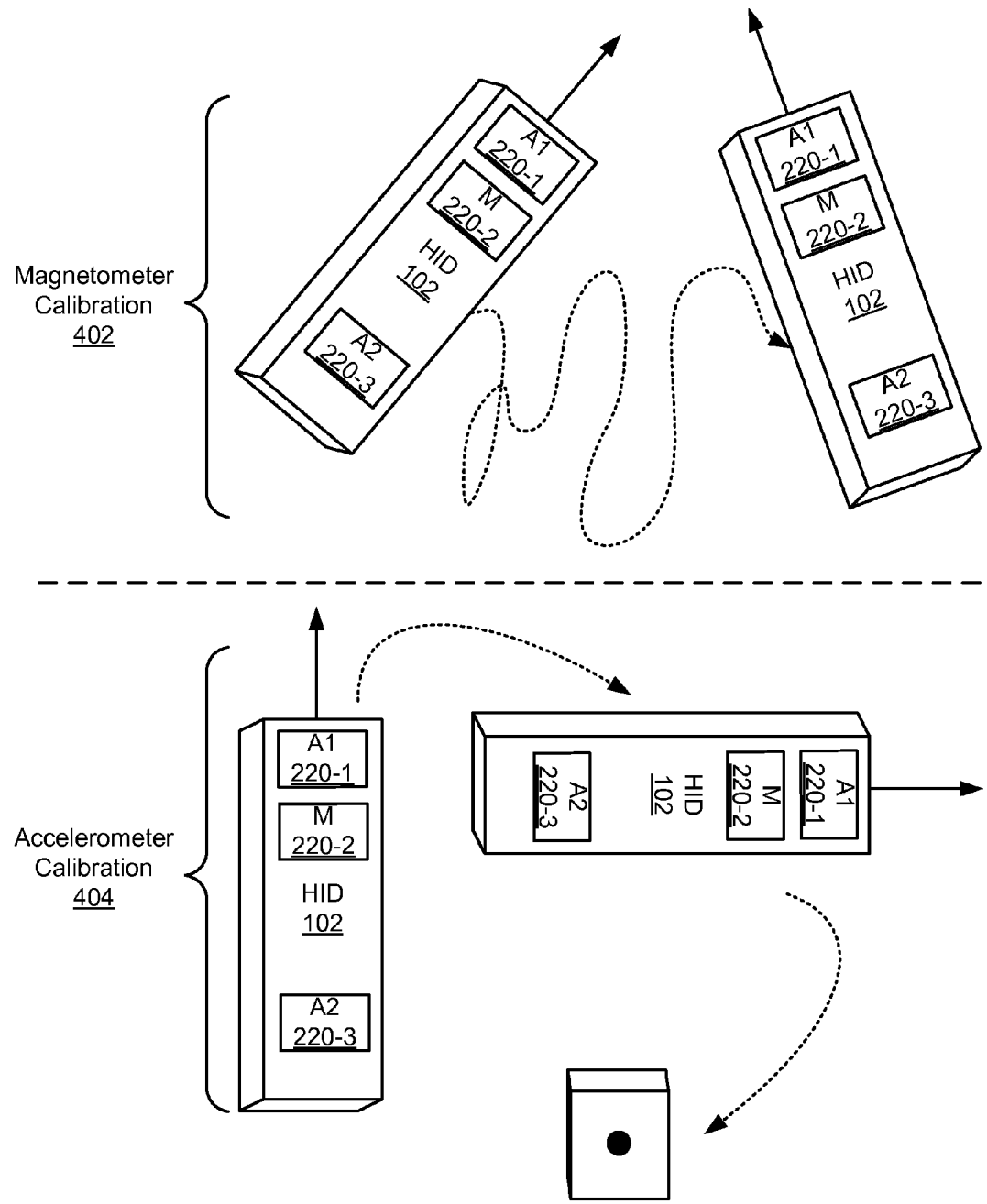
FIG. 4 is a diagram illustrating an example of human interface device calibration, according to some embodiments.

While many different combinations of sensors can be used to determine a navigational state of a device, one combination that provides measurements of navigational state that are sufficiently accurate and low cost for many commercial applications is a set of sensors including at least one multi-dimensional magnetometer and one or more multi-dimensional accelerometers. As described above, incorporation of these sensors into a device may introduce error (e.g., "non-ideal" sensor characteristics) and thus recalibration of the sensors after device assembly may be beneficial for improving the accuracy of the sensors. However, calibrating these sensors separately may fail to produce sufficiently accurate calibrations. In particular, accelerometers can be calibrated more effectively by using additional sensor inputs (e.g., magnetometer measurements) as additional inputs to the calibration process, as illustrated in FIG. 4.

In some embodiments it is advantageous to calibrate 402 a Magnetometer (e.g., 220-2 in FIG. 4) using magnetometer measurements retrieved from the magnetometer while Device 102 is moved through a large number of different orientations prior to calibrating one or more accelerometers of Device 102. After the magnetometer has been calibrated one or more Accelerometers (e.g., 220-1 and 220-3 in FIG. 4) of Device 102 are calibrated (404) using accelerometer measurements retrieved from the accelerometer(s) that are collected while Device 102 is placed in a series of different orientations. Although in FIG. 4, Device 102 is shown as being rotated into three orthogonal orientations, a larger number of non-orthogonal orientations could also be used, provided that the orientations provide a sufficient measurement diversity. Details on the steps for calibrating these sensors are provided below in greater detail with reference to FIGS. 5, 6A-6B and 7A-7B.

Figure 5:
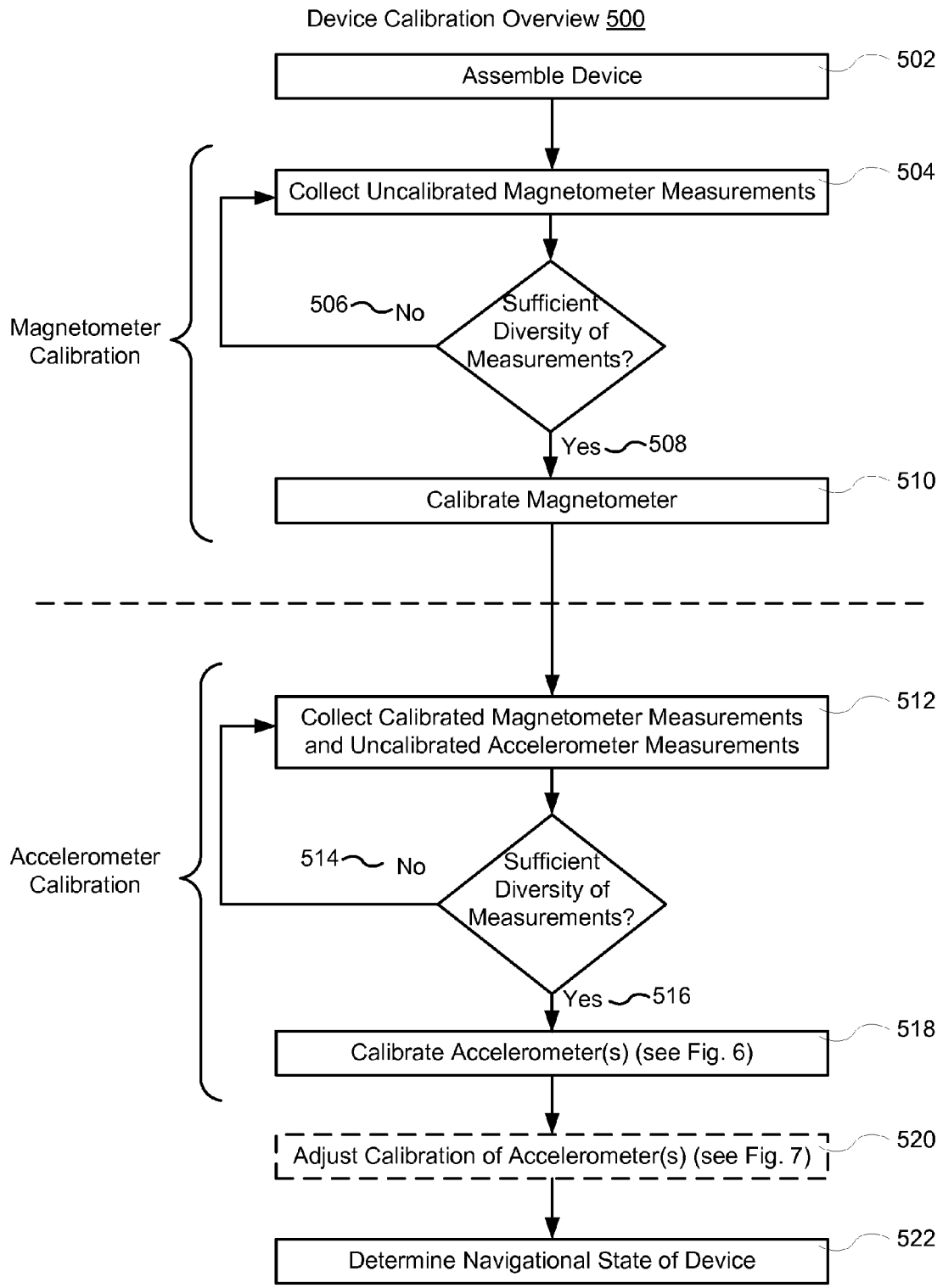
FIG. 5 is a flow diagram of a method for human interface device self-calibration, according to some embodiments.

Attention is now directed to FIG. 5, which illustrates a method 500 for calibrating sensors (e.g., accelerometers and/or magnetometers) of a human interface device once the sensors have been incorporated into the assembled device. The method is performed at a computer system (e.g., Device 102) including one or more processors and memory storing one or more programs, the one or more processors executing the one or more programs to perform one or more of the operations described below. In particular the method illustrated in FIG. 5 is particularly relevant to embodiments where at least one magnetometer and one or more accelerometers are to be calibrated and the calibration of the one or more accelerometers is dependent on having accurate magnetometer measurements.

The following operations are all performed after Device 102 has been assembled (502). Even in circumstances where the sensors are calibrated prior to incorporation into Device 102, additional error may be introduced in the process of assembling Device 102 so that the accuracy of the sensors will be improved by calibrating the sensors once Device 102 has been assembled. For example, the sensors may not be well aligned with the housing of Device 102 and/or the steps required to incorporate the sensors into Device 102 (e.g., soldering, etc.) may introduce sensor error by placing mechanical or thermal stress on the sensor.

Prior to calibrating the one or more accelerometers, Device 102 collects (504) uncalibrated magnetometer measurements and determines if there is a sufficient diversity of magnetometer measurements. In accordance with a determination by Device 102 that there is not (506) a sufficient diversity of magnetometer measurements, Device 102 continues to collect uncalibrated magnetometer measurements. However, in accordance with a determination by Device 102 that there is (508) a sufficient diversity of magnetometer measurements, Device 102 uses the collected uncalibrated magnetometer measurements to calibrate (510) the magnetometer.

Once the magnetometer has been calibrated, Device 102 moves on to calibrating the accelerometer. Device 102 collects (512) calibrated magnetometer measurements and uncalibrated accelerometer measurements and determines if there is a sufficient diversity of accelerometer measurements. In some embodiments, for each sample attitude of Device 102, the uncalibrated accelerometer measurement is associated with the calibrated magnetometer measurement, so that the calibrated magnetometer measurement can be retrieved and used to assist in calibration of the accelerometer in conjunction with the associated uncalibrated accelerometer measurement. In some embodiments, retrieving a calibrated magnetometer measurement includes retrieving an uncalibrated magnetometer measurement and adjusting the uncalibrated magnetometer measurement with magnetometer conversion values to produce a calibrated magnetometer measurement. In some embodiments, the calibrated magnetometer measurement is stored, while in other embodiments, the uncalibrated magnetometer measurement and magnetometer conversion values are stored and the uncalibrated magnetometer measurement is retrieved and adjusted with the magnetometer conversion values in response to requests for the calibrated magnetometer measurement.

In accordance with a determination by Device 102 that there is not (514) a sufficient diversity of accelerometer measurements, Device 102 continues to collect calibrated magnetometer measurements and uncalibrated accelerometer measurements. However, in accordance with a determination by Device 102 that there is (516) a sufficient diversity of accelerometer measurements, Device 102 uses the collected calibrated magnetometer measurements and uncalibrated accelerometer measurements to calibrate (518) the accelerometer(s), as described in greater detail below with reference to FIG. 6. Additionally, in some embodiments Device 102 adjusts (520) the calibration of the accelerometer. For example, when there are multiple accelerometers that are being calibrated, a difference between sensor measurements from two or more of the multiple accelerometers may be used to determine an adjustment to the calibration of one or more of the accelerometers, as described in greater detail below with reference to FIG. 7.

Once the magnetometer and one or more accelerometers have been calibrated, the sensors can be used to determine (522) a navigational state (e.g., orientation and/or position) of Device 102 (e.g., using a Kalman filter as described in greater detail in U.S. Pat. Pub. No. 2010/0174506).

It should be understood that the particular order in which the operations in FIG. 5 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 600 and 700 (e.g., FIGS. 6A-6B or 7A-7B respectively) are also applicable in an analogous manner to method 500 described above with respect to FIG. 5. For example, the sensors (e.g., magnetometers, accelerometers, etc.) described above with reference to method 500 may have one or more of the characteristics of the various sensors described herein with reference to methods 600 and 700 and/or the sensors may be calibrated in the manner described herein with reference to methods 600 and 700. For brevity, these details are not repeated here.

Figure 6A:
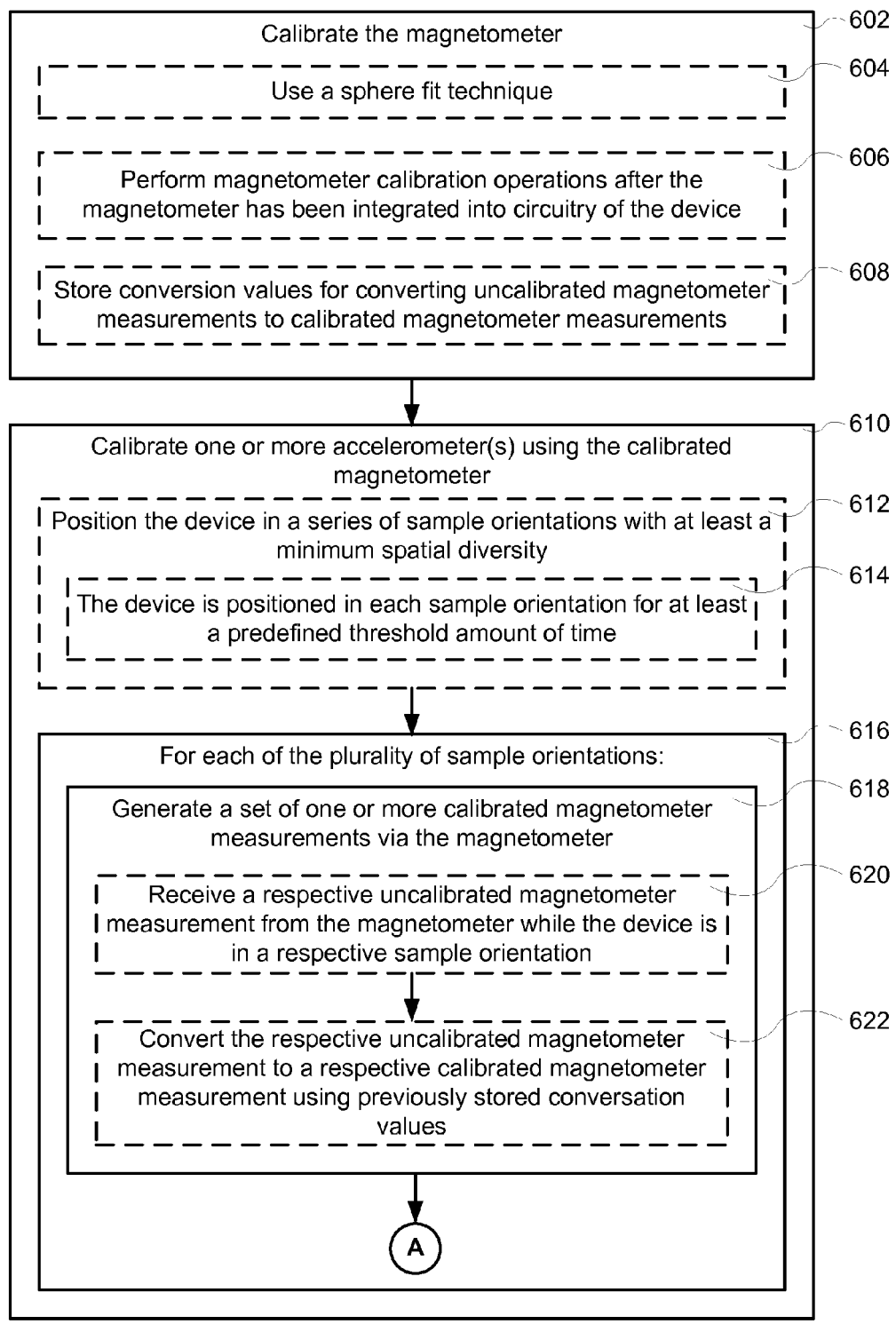
FIGS. 6A-6B are flow diagrams of a method for human interface device self-calibration, according to some embodiments.
Figure 6B:
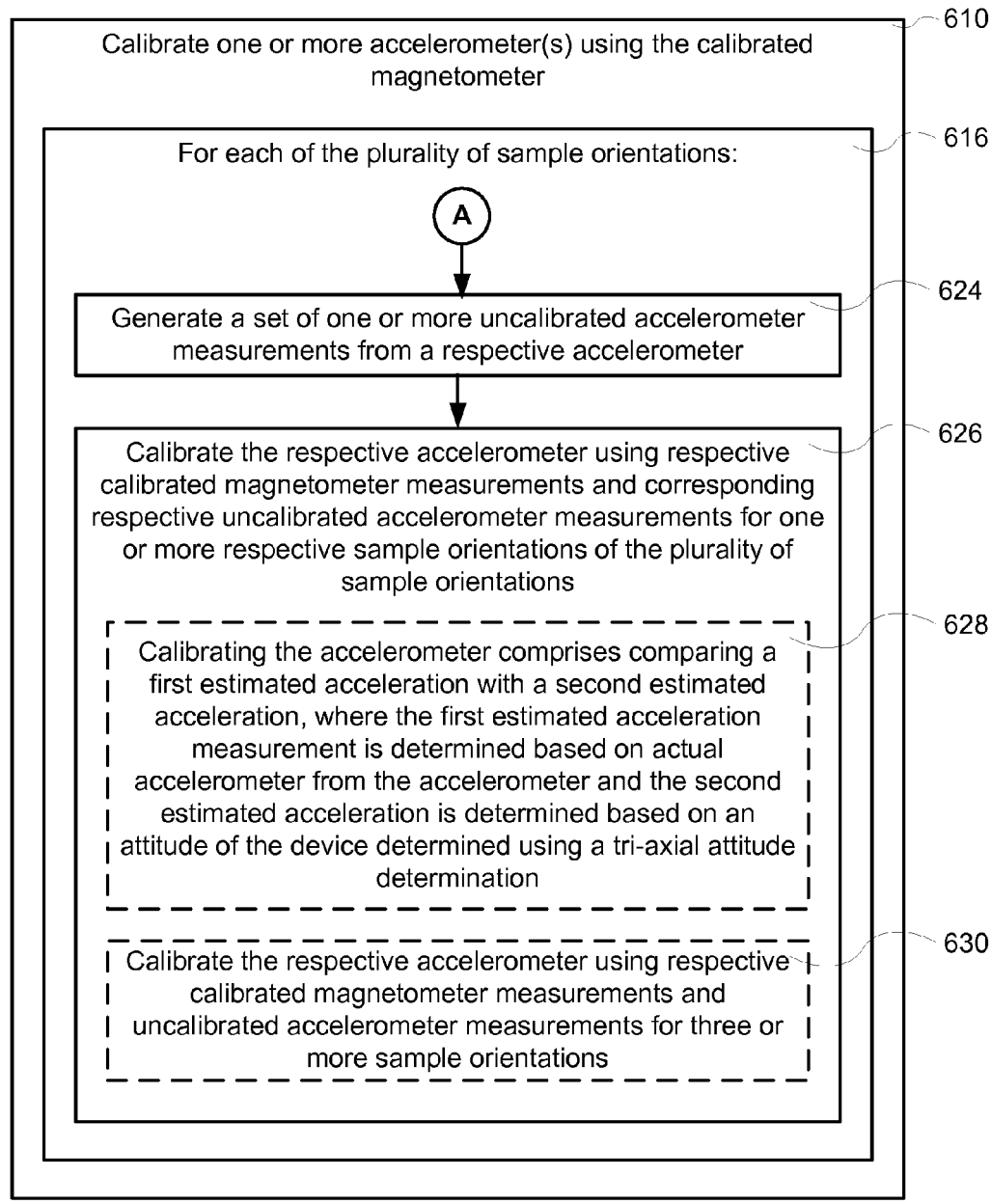

Attention is now directed to FIGS. 6A-6B, which illustrate a method 600 for calibrating sensors (e.g., accelerometers and/or magnetometers) of a human interface device. The method is performed at a device (e.g., Device 102) including one or more processors and memory storing one or more programs, the one or more processors executing the one or more programs to perform one or more of the operations described below.

Device 102 (e.g., the human interface device including a magnetometer and an accelerometer) calibrates (602) the magnetometer. In some embodiments, calibrating the magnetometer comprises using (604) a sphere fit technique to calibrate the magnetometer, as described in greater detail below with reference to Equation 4. In some embodiments, calibrating the magnetometer comprises performing (606) magnetometer calibration operations after the magnetometer has been integrated into circuitry of Device 102, so that the calibration takes into account any non-ideal characteristics introduced during the process of incorporating the magnetometer into Device 102. In some embodiments, calibrating the magnetometer comprises storing (608) magnetometer conversion values for converting uncalibrated magnetometer measurements to calibrated magnetometer measurements.

The magnetic calibration is based on the sphere fit model, whereby the estimated states are used to remove linear distortions. The uncalibrated measurements from a magnetometer will typically initially resemble a non-spherical ellipsoid. The goal is to fit the distorted measurements into a uniform sphere by adjusting the magnetometer conversion values $x_1$-$x_9$ by reducing error ("e" in Equation 4) for a diverse set of magnetometer measurements. In some embodiments, collecting a diverse set of magnetometer measurement includes, for each new magnetometer measurement determining if the new magnetometer measurement is sufficiently different, by Euclidean distance in the measurement space, from all the previously gathered ones. If the new magnetometer measurement is sufficiently different from previously gathered magnetometer measurements, then the new magnetometer measurement is stored for use in calibrating the magnetometer. If the new magnetometer measurement is not sufficiently different from previously gathered magnetometer measurements, then the new magnetometer measurement is ignored and/or discarded.

Equation 4 provides one example of an equation that can be used to determine a set of magnetometer conversion values $x_1$-$x_9$ for a magnetometer using a sphere fit.

$$e = x_4^2 - \left( \begin{bmatrix} 1 & x_7 & x_8 \\ x_7 & 1+x_5 & x_9 \\ x_8 & x_9 & 1+x_6 \end{bmatrix} \vec{m}_{meas} + \begin{bmatrix} x_1 \\ x_2 \\ x_3 \end{bmatrix} \right)^T \quad (4)$$

$$\left( \begin{bmatrix} 1 & x_7 & x_8 \\ x_7 & 1+x_5 & x_9 \\ x_8 & x_9 & 1+x_6 \end{bmatrix} \vec{m}_{meas} + \begin{bmatrix} x_1 \\ x_2 \\ x_3 \end{bmatrix} \right)$$

In Equation 4, magnetometer conversion values $x_1$-$x_3$ correspond to offset, magnetometer conversion values $x_4$-$x_6$ correspond to scale, and magnetometer conversion values $x_7$-$x_9$ correspond to skew and, optionally, rotation. In this example, an estimation of the error (e) calculated in accordance with Equation 4 and subsequently used to determine updated magnetometer conversion values, which are, in turn, used to generate a subsequent error estimations using the Gauss-Newton method.

For a first iteration, the magnetometer conversion values (x) in Equation 4 are set to a predefined value (e.g., zero or some other starting value), and for each magnetometer measurement in the diverse set of magnetometer measurements, a value for (e) is calculated. For each of a plurality of sequential iterations, adjustments to the magnetometer conversion values (x) are determined based on the estimated error (e), using the well-known Gauss-Newton method. A more complete description of implementing the Gauss-Newton method is provided in "Derivative free analogues of the Levenberg-Marquardt and Gauss algorithms for nonlinear least squares approximation", Kenneth M. Brown and J. E. Dennis, 1970. Numer. Math. 18, 287-297 (1972), which is incorporated herein by reference in its entirety. The adjusted magnetometer conversion values determined in the current iteration are used to generate values of the estimated error (e) for the next iteration. Iterations are repeated until the magnetometer conversion values produce an estimated error (e) that is sufficiently small (e.g., below a predefined threshold). Typically, magnetometer conversion values that produce an acceptably small error can be produced with approximately 20-30 iterations. Performing additional iterations of the Gauss-Newton method will generally not increase the accuracy of the magnetometer after convergence has been reached (i.e., the error value (e) has reached a minimum). However, in some implementations fewer than 20-30 iterations of the Gauss-Newton method can be used if computational resources are scarce, as additional iterations increase the time and computational resources (memory, processing power, etc.) that are consumed by the calibration process. Thus, the number of iterations can be adjusted in accordance with the desired tradeoff between accuracy and speed/computational resources. It should be understood that while the Gauss-Newton estimation method is described as one possible approach for performing a sphere fit, many other options exist, for example a Kalman filter could be used to iteratively estimate the magnetometer conversion values as each magnetometer measurement is received.

In some embodiments, after calibrating the magnetometer, one or more accelerometers are calibrated (610) using the calibrated magnetometer. In some embodiments, Device 102 is positioned (612) in a series of sample orientations with at least a minimum spatial diversity. It should be understood that the series of sample orientations could be a set of predefined sample orientations or a set of opportunistically captured sample orientations. When the sample orientations are opportunistically captured, typically more sample orientations are needed to achieve the minimum spatial diversity. Typically, the order in which the sample orientations are captured is not critical. However in some implementations, a user may be instructed to place Device 102 in a sequence of predefined approximate orientations so as to ensure that the minimum spatial diversity of measurements is reached quickly. In some embodiments, collecting a diverse set of accelerometer measurement includes, for each new accelerometer measurement determining if the new accelerometer measurement is sufficiently different, by Euclidean distance in the measurement space, from all the previously gathered ones. If the new accelerometer measurement is sufficiently different from previously gathered accelerometer measurements, then the new accelerometer measurement is stored for use in calibrating the accelerometer. If the new accelerometer measurement is not sufficiently different from previously gathered accelerometer measurements, then the new accelerometer measurement is ignored and/or discarded. In some embodiments the determination as to whether or not a set of sensor measurements has sufficient spatial diversity is based at least in part on the quality of measurements in the set of sensor measurements. In other words, the lower the noise of the sensor measurements, the less spatially diverse the sensor measurement need to be to be determined to have sufficient spatial diversity. In some embodiments, an angular separation of at least 30 degrees between sensor measurements yields "sufficient" spatial diversity of measurements.

In some embodiments, Device 102 is positioned (614) in each sample orientation for at least a predefined threshold amount of time (e.g., 1 second, 3 seconds or any reasonable amount of time) in order to allow Device 102 to acquire an accelerometer measurement without an acceleration component due to the movement of Device 102 from a previous orientation.

Operations 618-630 are performed (616) for each of a plurality of sample orientations. Device 102 generates (618) a set of one or more calibrated magnetometer measurements via the magnetometer. In some embodiments, generating a calibrated magnetometer measurement for a respective sample orientation comprises receiving (620) a respective uncalibrated magnetometer measurement from the magnetometer while Device 102 is in a respective sample orientation and converting (622) the respective uncalibrated magnetometer measurement to a respective calibrated magnetometer measurement using the conversation values.

Device 102 generates (624) a set of one or more uncalibrated accelerometer measurements. Device 102 calibrates (626) the accelerometer using respective calibrated magnetometer measurements and corresponding respective uncalibrated accelerometer measurements for one or more respective sample orientations of the plurality of sample orientations (e.g., as described in greater detail below with reference to Equations 5-6). In some embodiments, calibrating the accelerometer comprises (628) comparing a first estimated acceleration with a second estimated acceleration, where the first estimated acceleration is determined based on actual accelerometer measurements from the accelerometer and the second estimated acceleration is determined based on an attitude of Device 102 determined using a tri-axial attitude determination (e.g., $C_{TRIAD}$ in Equation 6 below). In some embodiments, calibrating the accelerometer comprises using (630) respective calibrated magnetometer measurements and uncalibrated accelerometer measurements for three or more sample orientations.

Equations 5-6 provides one example of equations that can be used to determine a set of accelerometer conversion values $x_1$-$x_7$ for an accelerometer using a calibrated magnetometer.

$$\vec{a}_{corrected} = \left( \begin{bmatrix} 1+x_4 & 0 & 0 \\ 0 & 1+x_5 & 0 \\ 0 & 0 & 1+x_6 \end{bmatrix} \vec{a}_{meas} + \begin{bmatrix} x_1 \\ x_2 \\ x_3 \end{bmatrix} \right) = (I+D)\vec{a}_{meas} + \vec{b} \quad (5)$$

$$\vec{e} = \vec{a}_{corrected} - C_{TRIAD}(\vec{a}_{corrected}, \vec{m}_{corrected}, \vec{H}_{ref}(x_7))\vec{g}_1 \quad (6)$$

In Equations 5-6, accelerometer conversion values $x_1$-$x_3$ correspond to offset, accelerometer conversion values $x_4$-$x_6$ correspond to scale and accelerometer conversion value $x_7$ corresponds to an estimation of the angle between the local magnetic field and gravity (e.g., a value based on the local magnetic inclination, which is an angle between the Earth's magnetic field and the Earth's surface proximate to Device 102). The off-diagonal terms in the D matrix, which would account for skew and rotation are ignored in the particular embodiment described above, but could be calculated in an alternative embodiment. In some embodiments, the off-diagonal terms are calculated using the method described below with reference to Equations 7-12. In this example, an estimation of the corrected acceleration is calculated in accordance with Equation 5 using the estimated accelerometer conversion values and the results are compared with an alternative estimation of acceleration that is based on a measurement from the calibrated magnetometer (and thus will typically be more accurate, as the magnetometer has already been calibrated) to determine an estimated accelerometer error ($\vec{e}$).

In particular, in Equation 6, the estimated acceleration using the sensor model from Equations 1 and 5 is compared with an estimated acceleration due to gravity that should be detected by the sensor in the orientation at which the sensor measurements were determined. In order to determine this estimated acceleration due to gravity, the orientation of the sensor is estimated using a "Tri-Axial Attitude Determination" (hereinafter TRIAD) method that takes measured acceleration, measured magnetic field, a reference magnetic field and a reference acceleration into account to determine an orientation, as described in greater detail in H. D. Black, "A Passive System for Determining the Attitude of a Satellite," AIAA Journal, Vol. 2, July 1964, pp. 1350-1351. With the assumption that Device 102 is located near the Earth's surface, the average acceleration at the Earth's surface (e.g., [0,0,9.8] m/s²) can be used as the reference acceleration, and the reference magnetic field can be determined using the reference acceleration (gravity) and an estimated angle between gravity and the Earth's magnetic field. Thus, $C_{TRIAD}$ in Equation 6 takes as inputs: the calibrated measured acceleration (using coefficients determined in a prior iteration), the calibrated measured magnetic field (using the calibrated magnetometer), an estimated angle between gravity and the Earth's magnetic field. The orientation determined by $C_{TRIAD}$ is multiplied by the average acceleration at the Earth's surface (e.g., [0,0,9.8] m/s$^2$) to get a different estimate of acceleration of Device 102. The comparison of the accelerometer-only estimation of acceleration from Equation 5 with the combined accelerometer/magnetometer estimation of acceleration, which is typically more accurate because it uses an additional measurement (e.g., a calibrated magnetometer measurement) from a calibrated sensor, enables the accelerometer conversion values for the accelerometer-only estimation of acceleration to be adjusted more to improve the precision of the accelerometer-only estimation of acceleration using the Gauss-Newton method, as described in greater detail below.

For a first iteration, the accelerometer conversion values (x) in Equations 5-6 are set to a predefined value (e.g., zero or some other starting value), and for each accelerometer measurement in the diverse set of accelerometer measurements, a corrected accelerometer measurement is determined (e.g., using Equation 5). Subsequently, an estimated accelerometer error ($\vec{e}$) is determined by comparing the corrected accelerometer measurement with an estimated acceleration determined based on an estimated orientation determined using the corrected accelerometer measurement and a corresponding magnetometer measurement (e.g., using Equation 6). For each of a plurality of sequential iterations, adjustments to the accelerometer conversion values (x) are determined based on the value of the estimated accelerometer error ($\vec{e}$) using the Gauss-Newton method (e.g., adjusting the accelerometer conversion values in a way that will reduce the estimated accelerometer error ($\vec{e}$). The adjusted accelerometer conversion values determined in the current iteration are used to generate values for estimated accelerometer error ($\vec{e}$) for the next iteration.

In some embodiments, when multiple accelerometer measurements acquired at different device orientations are used to calibrate the accelerometer, during a single iteration a different estimated accelerometer error ($\vec{e}$) is calculated for each accelerometer measurement of the multiple accelerometer measurements using the same set of accelerometer conversion values (x), and the adjustments to the accelerometer conversion values are determined for all of the accelerometer measurements in the multiple accelerometer measurements. In other words, each iteration includes determining an estimated accelerometer error ($\vec{e}$) for each accelerometer measurement and adjusting the shared accelerometer conversion values (x) so as to minimize these estimated accelerometer errors, on average. Iterations are repeated until the accelerometer conversion values produce an estimated accelerometer error that is sufficiently small (e.g., below a predefined threshold). Typically, accelerometer conversion values that produce an acceptably small error can be generated with approximately 20-30 iterations. Performing additional iterations of the Gauss-Newton method will generally not increase the accuracy of the accelerometer after convergence has been reached (i.e., the error value (e) has reached a minimum). However, in some implementations fewer than 20-30 iterations of the Gauss-Newton method can be used if computational resources are scarce, as additional iterations increase the time and computational resources (memory, processing power, etc.) that are consumed by the calibration process. Thus, the number of iterations can be adjusted in accordance with the desired tradeoff between accuracy and speed/computational resources. It should be understood that while the Gauss-Newton estimation method is described as one possible approach for calibrating an accelerometer based on a TRIAD estimation of attitude, many other options exist, for example a Kalman filter could be used to iteratively estimate the accelerometer conversion values as each set of accelerometer and magnetometer measurements is received.

It should be understood that the particular order in which the operations in FIGS. 6A-6B have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 500 and 700 (e.g., FIG. 5 or 7A-7B respectively) are also applicable in an analogous manner to method 600 described above with respect to FIGS. 6A-6B. For example, the sensors (e.g., magnetometers, accelerometers, etc.) described above with reference to method 600 may have one or more of the characteristics of the various sensors described herein with reference to methods 500 and 700 and/or the sensors may be calibrated in the manner described herein with reference to methods 500 and 700. For brevity, these details are not repeated here.

Figure 7A:
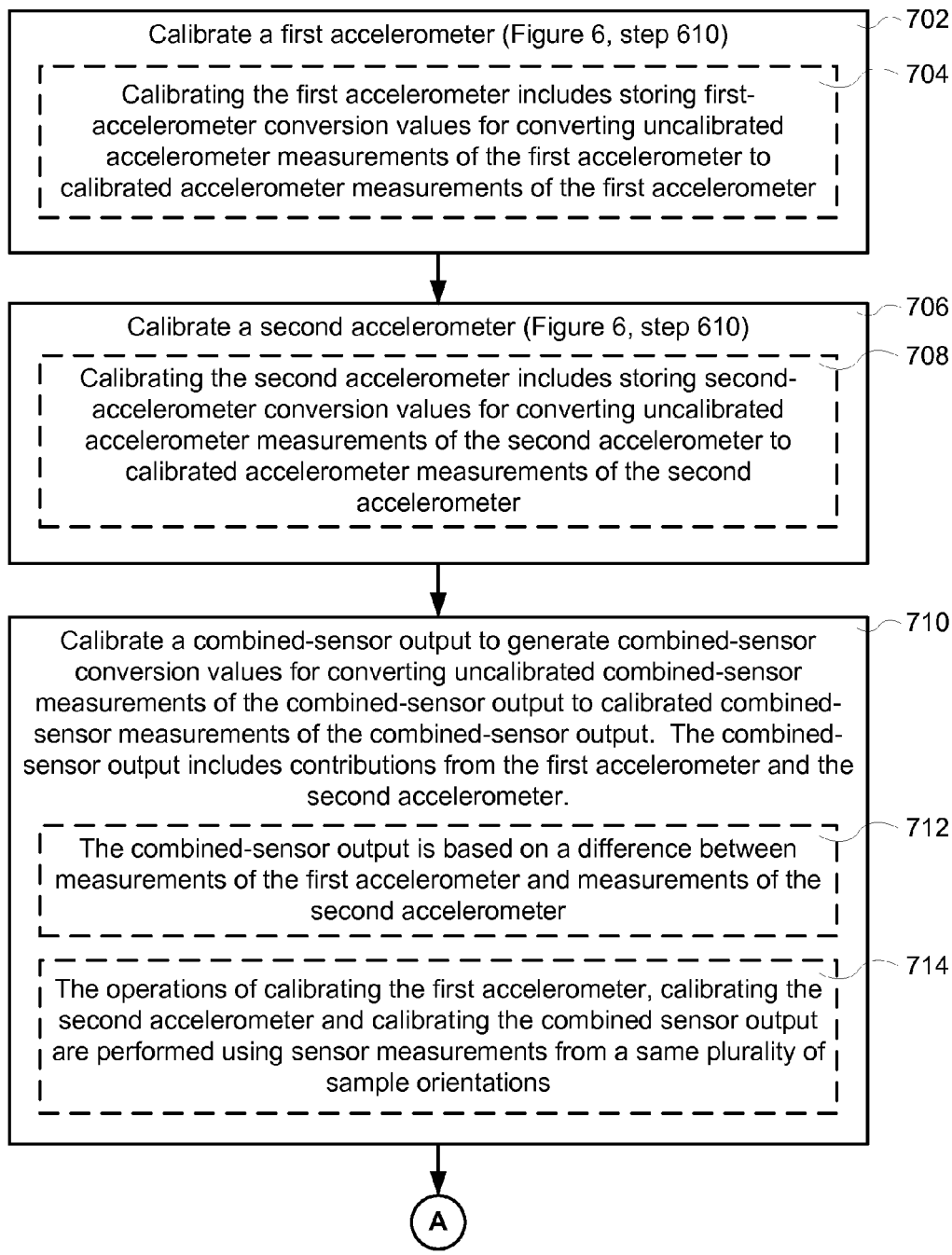
FIGS. 7A-7B are flow diagrams of a method for human interface device self-calibration, according to some embodiments.
Figure 7B:
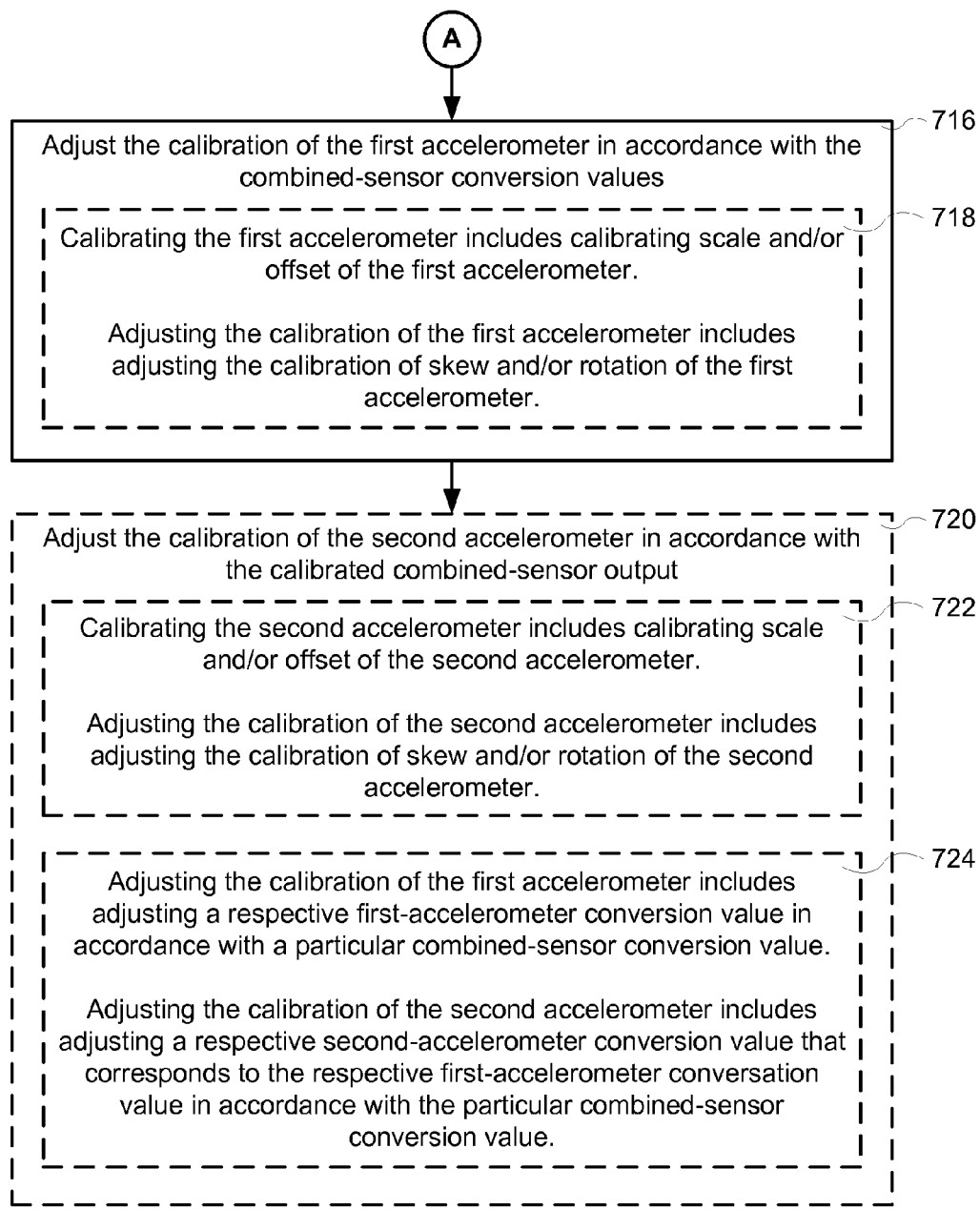

Attention is now directed to FIGS. 7A-7B, which illustrate a method 700 for calibrating sensors (e.g., accelerometers and/or magnetometers) of a human interface device. The method is performed at a device (e.g., Device 102) including one or more processors and memory storing one or more programs, the one or more processors executing the one or more programs to perform one or more of the operations described below.

Device 102 (e.g., the human interface device that includes multiple accelerometers) calibrates (702) a first accelerometer. In some embodiments, calibrating the first accelerometer includes storing (704) first-accelerometer conversion values (e.g., values (x) for a skew/scale matrix $D_1$ and a displacement vector $\vec{b}_1$) for converting uncalibrated accelerometer measurements of the first accelerometer to calibrated accelerometer measurements of the first accelerometer. Device 102 calibrates (706) the second accelerometer. In some embodiments, calibrating the second accelerometer includes storing (708) second-accelerometer conversion values (e.g., values (x) for a skew/scale matrix $D_2$ and a displacement vector $\vec{b}_2$) for converting uncalibrated accelerometer measurements of the second accelerometer to calibrated accelerometer measurements of the second accelerometer. In one implementation, the first and second accelerometers are each separately calibrated using the calibration described above with reference to Equation 4 above.

Device 102 also calibrates (710) a combined-sensor output to generate combined-sensor conversion values (e.g., differential conversion values) for converting uncalibrated combined-sensor measurements of the combined-sensor output to calibrated combined-sensor measurements of the combined-sensor output, where the combined-sensor output includes contributions from the first accelerometer and the second accelerometer. In some embodiments, the combined-sensor output is (712) based on a difference between measurements of the first accelerometer and measurements of the second accelerometer, as described below with reference to Equations 7-9. In some embodiments, the operations of calibrating the first accelerometer, calibrating the second accelerometer and calibrating the combined sensor output are performed using (714) sensor measurements from a same plurality of sample orientations.

For example, in Equations 7-9, below, the combined-sensor output ($\vec{a}_{\mathit{diff}}$) is the difference between the output of a first accelerometer and the output of a second accelerometer. In this example, the error is a difference between the corrected accelerometer measurement ($\vec{a}_{\mathit{diff}}$) and an alternative estimation of acceleration that is based on an estimated orientation of Device 102 in accordance with the TRIAD method, described above. In some embodiments, the $C_{TRIAD}$ orientation is determined using $\vec{a}_{\mathit{diff}}$ and the error estimation and proceeds as described above with reference to Equation 6. However, in other embodiments, the $C_{TRIAD}$ orientation is simply a previously calculated orientation generated using output from one of the accelerometers. In some implementations the accelerometer that is chosen is the accelerometer that will typically be closest to the user's hand when Device 102 is in operation (e.g., the accelerometer closest to a handhold of Device 102, such as accelerometer 220-3 in FIG. 2).

Determining an estimated error of the combined-sensor output ($\vec{a}_{\mathit{diff}}$) enables estimation of the difference between accelerometer conversion values for the two accelerometers (represented below as ($D_2 - D_1$) and ($b_2 - b_1$)). It should be understood, that these combined-sensor conversion values are not calculated using previously calculated accelerometer conversion values for the individual accelerometers, rather, new combined-sensor conversion values $D_d$ and $\vec{b}_d$ are calculated and these combined-sensor conversion values represent differences between the accelerometer conversion values of the two accelerometers. These combined-sensor conversion values are particularly advantageous for determining accelerometer conversion values for skew and rotation terms. In particular, in Equations 7-9, the off-diagonal (skew and rotation) terms' contributions to the error are the same order of magnitude as compared to the diagonals.

$$\vec{e} = (D_2 - D_1)C_{TRIAD}\vec{g}_1 + (\vec{b}_2 - \vec{b}_1) - \vec{a}_{\mathit{diff}} \quad (7)$$

$$D_d = D_2 - D_1 = \begin{bmatrix} x_4 & x_7 & x_8 \\ x_{10} & x_5 & x_9 \\ x_{11} & x_{12} & x_6 \end{bmatrix} \quad (8)$$

$$\vec{b}_d = \vec{b}_2 - \vec{b}_1 = \begin{bmatrix} x_1 \\ x_2 \\ x_3 \end{bmatrix} \quad (9)$$

In Equations 7-12, combined-sensor conversion values $x_1$-$x_3$ correspond to offset, combined-sensor conversion values $x_4$-$x_6$ correspond to scale and combined-sensor conversion values $x_7$-$x_{12}$ correspond to skew and, optionally, rotation. In this example, an estimated differential accelerometer error ($\vec{e}$) (e.g., calculated in accordance with Equation 7) is calculated and used to determine updated combined-sensor conversion values, which are, in turn, used to generate a subsequent error estimations using the Gauss-Newton method. In this example, an estimation of the differential acceleration ($\vec{a}_{\mathit{diff}}$) is calculated in accordance with measurements from the two accelerometers and an alternative estimation of differential acceleration is calculated in accordance with the attitude of Device 102 (e.g., determined in accordance with calibrated magnetometer measurements, calibrated accelerometer measurements from one of the accelerometers and an estimated angle between gravity and the Earth's magnetic field using the TRIAD method). The combined-sensor conversion values (x) in Equations 8-9 are determined using the Gauss-Newton method.

For a first iteration, the combined-sensor conversion values (x) in Equations 8-9 are set to a predefined value (e.g., zero or some other starting value), and for each accelerometer measurement in the diverse set of accelerometer measurements, a corrected accelerometer measurement is determined (e.g., using Equation 5 with the previously identified accelerometer conversion values for the accelerometer). Subsequently, an estimated differential accelerometer error ($\vec{e}$) is determined by comparing the differential acceleration ($\vec{a}_{\mathit{diff}}$) with an estimated differential acceleration determined based on an estimated attitude determined using TRIAD method. For each of a plurality of sequential iterations, adjustments to the combined-sensor conversion values (x) are determined based on the value of the estimated accelerometer error ($\vec{e}$) using the Gauss-Newton method (e.g., adjusting the combined-sensor conversion values in a way that will reduce the estimated accelerometer error ($\vec{e}$). The adjusted combined-sensor conversion values determined in the current iteration are used to generate values for estimated accelerometer error ($\vec{e}$) for the next iteration.

In some embodiments, when multiple accelerometer measurements acquired at different device orientations are used to calibrate the accelerometer, during a single iteration a different estimated accelerometer error ($\vec{e}$) is calculated for each accelerometer measurement of the multiple accelerometer measurements using the same set of combined-sensor conversion values (x), and the adjustments to the combined-sensor conversion values are determined for all of the accelerometer measurements in the multiple accelerometer measurements. In other words, each iteration includes determining an estimated accelerometer error ($\vec{e}$) for each accelerometer measurement and adjusting the shared combined-sensor conversion values (x) so as to minimize these estimated accelerometer errors, on average. Iterations are repeated until the combined-sensor conversion values produce an estimated accelerometer error that is sufficiently small (e.g., below a predefined threshold). Typically, combined-sensor conversion values that produce an acceptably small error can be generated with approximately 20-30 iterations. Performing additional iterations of the Gauss-Newton method will generally not increase the accuracy of the accelerometer after convergence has been reached (i.e., the error value (e) has reached a minimum). However, in some implementations fewer than 20-30 iterations of the Gauss-Newton method can be used if computational resources are scarce, as additional iterations increase the time and computational resources (memory, processing power, etc.) that are consumed by the calibration process. Thus, the number of iterations can be adjusted in accordance with the desired tradeoff between accuracy and speed/computational resources. It should be understood that while the Gauss-Newton estimation method is described as one possible approach for differential calibration of accelerometers, many other options exist, for example a Kalman filter could be used to iteratively estimate the combined-sensor conversion values for the accelerometer as each accelerometer measurement is received.

It should be understood that these combined-sensor conversion values are not generally used to directly determine a corrected acceleration of Device 102. This is because the combined-sensor conversion values indicate a relative calibration between two different accelerometers. In other words, the combined-sensor conversion values enable the two accelerometers to be calibrated relative to one another (e.g., "tuned" to each other), rather than providing information that, by itself, enables the accelerometers to be calibrated with respect to the surrounding environment. As an illustrative example, in a situation where the two accelerometers have identical characteristics and orientation within Device 102, the estimated differential accelerometer error ($\vec{e}$) would always be zero, because there is no difference between the accelerometers, and thus $D_d$ and $\vec{b}_d$ would each be a null matrix (e.g., all of the combined-sensor conversion values (x) for $D_d$ and $\vec{b}_d$ zero). In other words, each non-zero combined-sensor conversion value for equations 7-12 corresponds to a difference between the characteristics and/or orientation of the two accelerometers within Device 102. These combined-sensor conversion values can therefore be used to improve the accelerometer calibration described above with reference to Equations 5-6, as described in greater detail below with reference to Equations 10-12.

After calibrating the combined-sensor output, Device 102 adjusts (716) the calibration of the first accelerometer in accordance with the combined-sensor conversion values. In some embodiments, calibrating (718) the first accelerometer includes calibrating scale and/or offset of the first accelerometer (e.g., the diagonal elements of $D_1$ and the elements of $\vec{b}_1$, respectively in Equation 11) and adjusting the calibration of the first accelerometer includes adjusting the calibration of skew and/or rotation of the first accelerometer (e.g., by subtracting at least a portion of the off-diagonal elements of $D_d$ from $D_1$, as shown in Equation 11). Additionally, in some embodiments, Device 102 also adjusts (720) the calibration of the second accelerometer in accordance with the calibrated combined-sensor output. In some of these embodiments, calibrating (722) the second accelerometer includes calibrating scale and/or offset of the second accelerometer (e.g., the diagonal elements of $D_2$ and the elements of $\vec{b}_2$, respectively in Equation 12) and adjusting the calibration of the second accelerometer includes adjusting the calibration of skew and/or rotation of the second accelerometer (e.g., by subtracting at least a portion of the off-diagonal elements of $D_d$ from $D_2$, as shown in Equation 12).

In some embodiments, adjusting (724) the calibration of the first accelerometer includes adjusting a respective first-accelerometer conversion value in accordance with a particular combined-sensor conversion value (e.g., adding a multiple of the particular combined-sensor conversion value to the respective first-accelerometer conversion value). Additionally, in some of these embodiments, adjusting the calibration of the second accelerometer includes adjusting a respective second-accelerometer conversion value that corresponds to the respective first-accelerometer conversation value in accordance with the particular combined-sensor conversion value. (e.g., subtracting a multiple of the particular combined-sensor conversion value from the respective second-accelerometer conversion value), an example of adjusting the calibration of the first accelerometer in this way is described in greater detail below with reference to Equations 10-12.

In some embodiments, the combined-sensor conversion values are used to adjust the skew accelerometer conversion values of the individual accelerometers (e.g., the first accelerometer and/or the second accelerometer). When the skew accelerometer conversion values (e.g., the off diagonal terms in the matrix $D_d$) are to be adjusted and scale accelerometer conversion values do not need to be adjusted, the on-diagonal terms are removed from $D_d$ (e.g., $x_4$-$x_6$ are set to zero) to generate an adjusted differential D matrix $D'_d$. $D'_d$ is then used to augment the D matrix for the accelerometer (from Equation 5). The respective D matrices for the respective accelerometers are represented below as $D_1$ (for the first accelerometer) and $D_2$ (for the second accelerometer) and $D_2$.

$$D'_d = \begin{bmatrix} 0 & x_7 & x_8 \\ x_{10} & 0 & x_9 \\ x_{11} & x_{12} & 0 \end{bmatrix} \quad (10)$$

$$D'_1 = D_1 - \frac{D'_d}{2} \quad (11)$$

$$D'_2 = D_2 + \frac{D'_d}{2} \quad (12)$$

In Equation 11, half of each the off-diagonal terms from the differential calibration are subtracted from $D_1$, while in Equation 12, half of each the off-diagonal terms from the differential calibration are added to $D_2$. It should be understood that these updates to the D matrices ($D_1$ and $D_2$) are not based on any additional or more accurate information that would intrinsically improve the accuracy of the calibration, because these updates are based on the same accelerometer and magnetometer measurements have been used for all of the calibrations described above. Rather, the updates to the D matrices take into account the differences between the output of the two accelerometers, which typically produces a better estimate of the off-diagonal (skew) terms than estimating the off-diagonal terms directly, thereby averaging out any outlying skew terms. This formulation of the estimation problem provides good estimates of the off-diagonal terms because it is much less sensitive to errors in the device orientation ($C_{TRIAD}$). In many non-differential accelerometer formulations, for a single accelerometer calibration, a small error in device orientation will produce a large error due to a misaligned gravity vector. In contrast, in the differential accelerometer formulation described above with reference to equations 7-12, these gravity vector misalignments cancel out.

It should be understood that the methods described above for calibrating multiple accelerometers by calibrating a combined-sensor output may be performed at a device that initially includes an uncalibrated magnetometer and where a calibrated magnetometer is used to determine the orientation of Device 102 using the TRIAD approach (e.g., the $C_{TRIAD}$ formula described above with reference to Equations 5-6). Thus, in some embodiments, Device 102 includes a magnetometer Device 102 calibrates a magnetometer (e.g., as described above with reference to Equation 4), where the magnetometer is calibrated using a set of measurements from a different plurality of sample orientations than the plurality of sample orientations used to calibrate the accelerometers (e.g., as described in greater detail above with reference to FIGS. 6A-6B). In some of these embodiments (e.g., where Device 102 includes a magnetometer), calibrating the first accelerometer includes calibrating the magnetometer and, for each of a plurality of sample orientations: generating a set of one or more calibrated magnetometer measurements via the magnetometer; generating a set of one or more uncalibrated first accelerometer measurements (e.g., as described in greater detail above with reference to Equations 5-6). In some of these embodiments, Device 102 calibrates the first accelerometer using respective calibrated magnetometer measurements and corresponding respective uncalibrated first accelerometer measurements for one or more respective sample orientations of the plurality of sample orientations. It should be understood that, in some implementations, the second accelerometer is calibrated in a manner analogous to the calibration of the first accelerometer.

It should be understood that the particular order in which the operations in FIGS. 7A-7B have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 500 and 600 (e.g., FIG. 5 or 6A-6B respectively) are also applicable in an analogous manner to method 700 described above with respect to FIGS. 7A-7B. For example, the sensors (e.g., magnetometers, accelerometers, etc.) described above with reference to method 700 may have one or more of the characteristics of the various sensors described herein with reference to methods 500 and 600 and/or the sensors may be calibrated in the manner described herein with reference to methods 500 and 600. For brevity, these details are not repeated here.

System Structure

Figure 8:
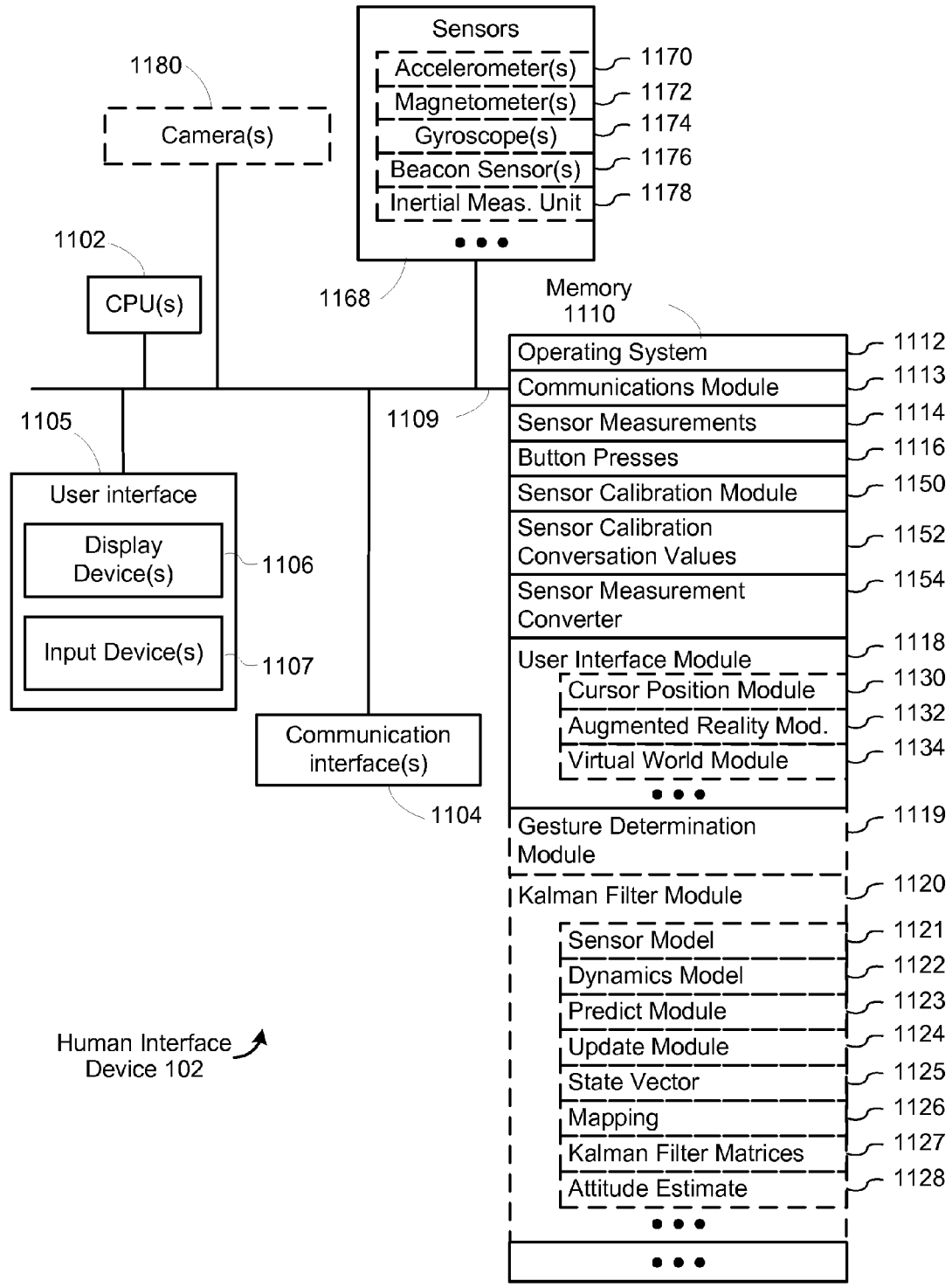
FIG. 8 presents a block diagram of an example human interface device, according to some embodiments.

FIG. 8 is a block diagram of Human Interface Device 102 (herein "Device 102"). Device 102 typically includes one or more processing units (CPUs) 1102, one or more network or other Communications Interfaces 1104 (e.g., a wireless communication interface, as described above with reference to FIG. 1), Memory 1110, Sensors 1168 (e.g., Sensors 220 such as one or more Accelerometers 1170, Magnetometers 1172, Gyroscopes 1174, Beacon Sensors 1176, Inertial Measurement Units 1178, Thermometers, Barometers, and/or Proximity Sensors, etc.), one or more Cameras 1180, and one or more Communication Buses 1109 for interconnecting these components. In some embodiments, Communications Interfaces 1104 include a transmitter for transmitting information, such as accelerometer and magnetometer measurements, and/or the computed navigational state of Device 102, and/or other information to Host 101. Communication buses 1109 typically include circuitry (sometimes called a chipset) that interconnects and controls communications between system components. Device 102 optionally includes user interface 1105 comprising Display 1106 (e.g., Display 104 in FIG. 1) and Input Devices 1107 (e.g., keypads, buttons, etc.). Memory 1110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1110 optionally includes one or more storage devices remotely located from the CPU(s) 1102. Memory 1110, or alternately the non-volatile memory device(s) within Memory 1110, comprises a non-transitory computer readable storage medium. In some embodiments, Memory 1110 stores the following programs, modules and data structures, or a subset thereof:

Operating System 1112 that includes procedures for handling various basic system services and for performing hardware dependent tasks;

Communication Module 1113 that is used for connecting Device 102 to Host 101 via Communication Network Interface(s) 1104 (wired or wireless); Communication Module 1113 is optionally adapted for connecting Device 102 to one or more communication networks, such as the Internet, other wide area networks, local area networks, metropolitan area networks, and so on;

Sensor Measurements 1114 (e.g., data representing accelerometer measurements, magnetometer measurements, gyroscope measurements, global positioning system measurements, beacon sensor measurements, inertial measurement unit measurements, thermometer measurements, atmospheric pressure measurements, proximity measurements, etc.);

data representing Button Presses 1116;

Sensor Calibration Module 1150 for calibrating sensors and, optionally, determining sensor calibration conversion values;

Sensor Calibration Conversion values 1152 that enable conversion of raw sensor output into a calibrated sensor output;

Sensor Measurement Converter 1154 for converting raw (uncalibrated) sensor measurements into calibrated sensor measurements using the sensor calibration conversation values;

User Interface Module 1118 that receives commands from the user via the Input Devices 1107 and generates user interface objects in the Display Device 1106, the user interface module may include one or more of: a Cursor Position Module 1130 for determining a cursor position for a cursor to be displayed in a user interface in accordance with changes in a navigational state of Device 102, an Augmented Reality Module 1132 for determining positions of one or more user interface objects to be displayed overlaying a dynamic background such as a camera output in accordance with changes in a navigational state of Device 102, a Virtual World Module 1134 for determining a portion of a larger user interface (a portion of a virtual world) to be displayed in accordance with changes in a navigational state of Device 102, and other application specific user interface modules;

Gesture Determination Module 1119 optionally determines gestures in accordance with detected changes in navigational state of Device 102; and Kalman Filter Module 1120 that determines the attitude of Device 102, as described in U.S. Pat. Pub. No. 2010/0174506 Equations 8-29, wherein the Kalman filter module 1120 includes: a Sensor Model 1121 (e.g., the sensor model described in Equations 28-29 of U.S. Pat. Pub. No. 2010/0174506), a Dynamics Model 1122 (e.g., the dynamics model described in Equations 15-21 of U.S. Pat. Pub. No. 2010/0174506), a Predict Module 1123 that performs the predict phase operations of the Kalman filter, an Update Module 1124 that performs the update operations of the Kalman filter, a State Vector 1125 of the Kalman filter (e.g., the state vector 2 in Equation 10 of U.S. Pat. Pub. No. 2010/0174506), a Mapping 1126, Kalman Filter Matrices 1127, and Attitude Estimates 1128 (e.g., the attitude estimates as obtained from the quaternion in the state vector 2 in Equation 10 of U.S. Pat. Pub. No. 2010/0174506).

It is noted that in some of the embodiments described above, Device 102 does not include a gesture determination module 1119, because gesture determination is performed by Host 101. In some embodiments described above, Device 102 also does not include Kalman filter module 1120 because Device 102 transmits sensor measurements (e.g., accelerometer and magnetometer measurements) and, optionally, button presses 1116 to Host 101 at which a navigational state of Device 102 is determined.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1102). The above identified modules or programs (i.e., sets of instructions) need not be implemented as separate software programs, procedures or modules, and thus various subsets of these modules may be combined or otherwise re-arranged in various embodiments. In some embodiments, Memory 1110 may store a subset of the modules and data structures identified above. Furthermore, Memory 1110 may store additional modules and data structures not described above.

Although FIG. 8 shows a "Human Interface Device 102," FIG. 8 is intended more as functional description of the various features which may be present in a human interface device. In practice, and as recognized by those of ordinary skill in the art, items shown separately could be combined and some items could be separated.

Figure 9:
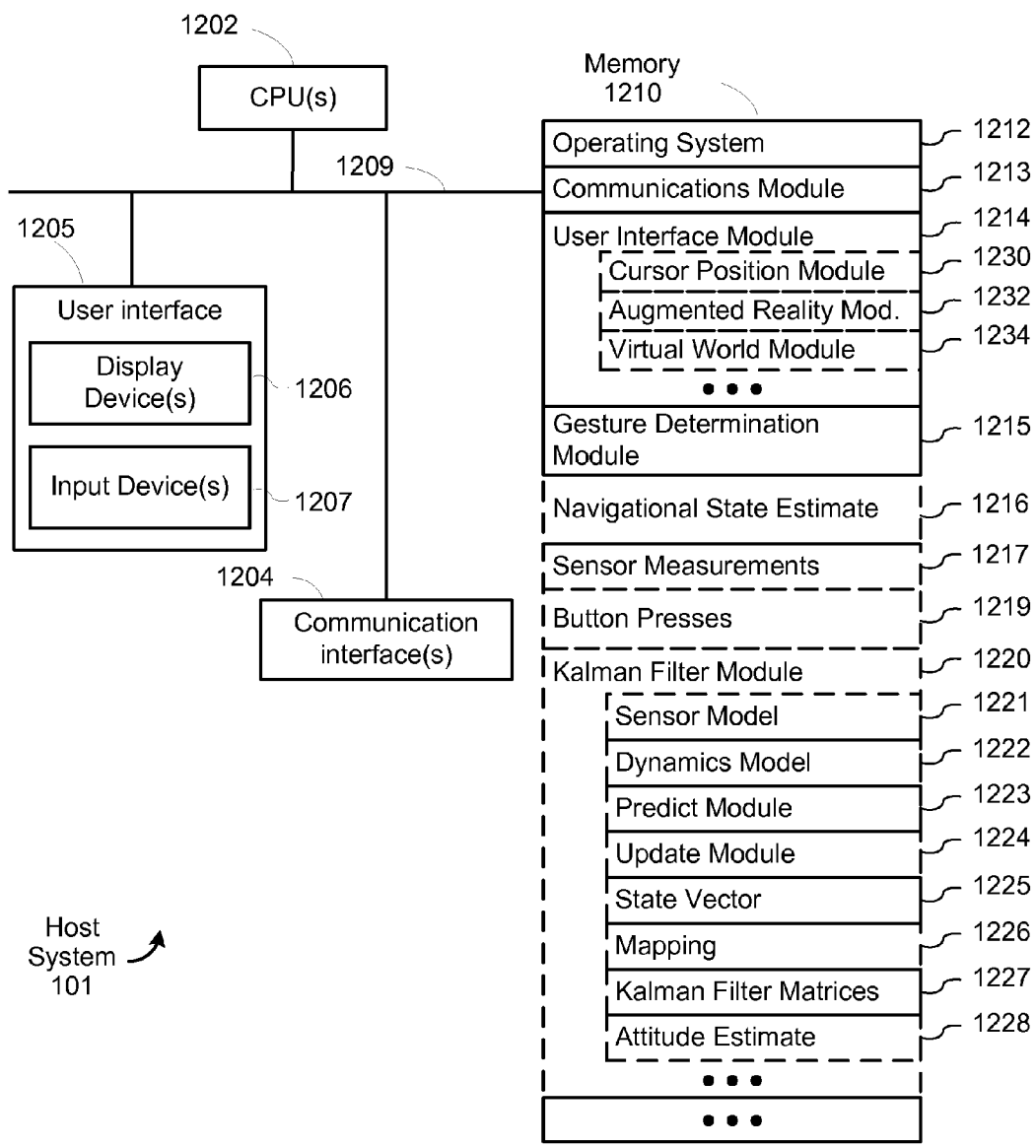
FIG. 9 presents a block diagram of an example host system, according to some embodiments.

FIG. 9 is a block diagram of Host Computer System 101 (herein "Host 101"). Host 101 typically includes one or more processing units (CPUs) 1202, one or more network or other Communications Interfaces 1204 (e.g., any of the wireless interfaces described above with reference to FIG. 1), Memory 1210, and one or more Communication Buses 1209 for interconnecting these components. In some embodiments, Communication Interfaces 1204 include a receiver for receiving information, such as accelerometer and magnetometer measurements, and/or the computed attitude of a human interface device (e.g., Device 102), and/or other information from Device 102. Communication Buses 1209 optionally include circuitry (sometimes called a chipset) that interconnects and controls communications between system components. Host 101 optionally includes a User Interface 1205 comprising a Display 1206 (e.g., Display 104 in FIG. 1) and Input Devices 1207 (e.g., a human interface device such as a multi-dimensional pointer, a mouse, a keyboard, a trackpad, a trackball, a keypad, buttons, etc.). Memory 1210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1210 optionally includes one or more storage devices remotely located from the CPU(s) 1202. Memory 1210, or alternately the non-volatile memory device(s) within Memory 1210, comprises a non-transitory computer readable storage medium. In some embodiments, Memory 1210 stores the following programs, modules and data structures, or a subset thereof:

- Operating System 1212 that includes procedures for handling various basic system services and for performing hardware dependent tasks;
- Communication Module 1213 that is used for connecting Host 101 to Device 102, and/or other devices or systems via Communication Network Interface(s) 1204 (wired or wireless), and for connecting Host 101 to one or more communication networks, such as the Internet, other wide area networks, local area networks, metropolitan area networks, and so on;
- User Interface Module 1214 that receives commands from the user via Input Device(s) 1207 and generates user interface objects in Display(s) 1206; the user interface module optionally includes one or more of: a cursor position module for determining a cursor position for a cursor to be displayed in a user interface in accordance with changes in a navigational state of Device 102, an augmented reality module for determining positions of one or more user interface objects to be displayed overlaying a dynamic background such as a camera output in accordance with changes in a navigational state of Device 102, a virtual world module for determining a portion of a larger user interface (a portion of a virtual world) to be displayed in accordance with changes in a navigational state of Device 102, and other application specific user interface modules;
- Gesture Determination Module 1215 that optionally determines gestures in accordance with detected changes in navigational state of Device 102;
- optionally, data representing Navigational State Estimate 1216 (e.g., an estimate of the position and/or attitude of Device 102) that is received from Device 102;
- optionally, data representing Sensor Measurements 1217 (e.g., accelerometer measurements, magnetometer measurements, gyroscope measurements, global positioning system measurements, beacon sensor measurements, inertial measurement unit measurements etc.) received from Device 102 and/or determined at Host 101;
- optionally, data representing Button Presses 1219 received from Device 102; and
- Kalman filter module 1220 that determines the attitude of Device 102, as described in U.S. Pat. Pub. No. 2010/0174506 with respect to Equations 8-29, wherein the Kalman filter module 1220 includes: a Sensor Model 1221 (e.g., the sensor model described in Equations 28-29 of U.S. Pat. Pub. No. 2010/0174506), a Dynamics Model 1222 (e.g., the dynamics model described in Equations 15-21 of U.S. Pat. Pub. No. 2010/0174506), a Predict Module 1223 that performs the predict phase operations of the Kalman filter, an Update Module 1224 that performs the update operations of the Kalman filter, a State Vector 1225 of the Kalman filter (e.g., the state vector 2 in Equation 10 of U.S. Pat. Pub. No. 2010/0174506), a Mapping 1226, Kalman filter matrices 1227, and Attitude Estimates 1228 (e.g., the attitude estimates as obtained from the quaternion in the state vector 2 in Equation 10 in U.S. Pat. Pub. No. 2010/0174506).

It is noted that in some of the embodiments described above, Host 101 does not store data representing Sensor Measurements 1217, and also does not include Kalman Filter Module 1220 because sensor measurements of Device 102 are processed at Device 102, which sends data representing Navigational State Estimate 1216 to Host 101. In other embodiments, Device 102 sends data representing Sensor Measurements 1217 to Host 101, in which case the modules for processing that data are present in Host 101.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1202). The above identified modules or programs (i.e., sets of instructions) need not be implemented as separate software programs, procedures or modules, and thus various subsets of these modules may be combined or otherwise re-arranged in various embodiments. The actual number of processors and software modules used to implement Host 101 and how features are allocated among them will vary from one implementation to another. In some embodiments, Memory 1210 may store a subset of the modules and data structures identified above. Furthermore, Memory 1210 may store additional modules and data structures not described above.

Note that methods 500, 600 and 700 described above are optionally governed by instructions that are stored in a non-transitory computer readable storage medium and that are executed by one or more processors of Device 102 or Host 101. As noted above, in some embodiments these methods may be performed in part on Device 102 and in part on Host 101, or on a single integrated system which performs all the necessary operations. Each of the operations shown in FIGS. 5, 6A-6B, 7A-7B may correspond to instructions stored in a computer memory or computer readable storage medium. The computer readable storage medium optionally includes a magnetic or optical disk storage device, solid state storage devices such as Flash memory, or other non-volatile memory device or devices. In some embodiments, the computer readable instructions stored on the computer readable storage medium are in source code, assembly language code, object code, or other instruction format that is interpreted by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a device including a first accelerometer and a second accelerometer:
calibrating the first accelerometer;
calibrating the second accelerometer;
calibrating a combined-sensor output to generate combined-sensor conversion values for converting uncalibrated combined-sensor measurements of the combined-sensor output to calibrated combined-sensor measurements of the combined-sensor output, wherein the combined-sensor output includes contributions from the first accelerometer and the second accelerometer; and
adjusting the calibration of the first accelerometer in accordance with the combined-sensor conversion values.

2. The method of claim 1, wherein the combined-sensor output is based on a difference between measurements of the first accelerometer and measurements of the second accelerometer.

3. The method of claim 1, wherein calibrating the first accelerometer includes storing first-accelerometer conversion values for converting uncalibrated accelerometer measurements of the first accelerometer to calibrated accelerometer measurements of the first accelerometer.

4. The method of claim 1, wherein calibrating the second accelerometer includes storing second-accelerometer conversion values for converting uncalibrated accelerometer measurements of the second accelerometer to calibrated accelerometer measurements of the second accelerometer.

5. The method of claim 1, wherein:
calibrating the first accelerometer includes calibrating scale and/or offset of the first accelerometer; and
adjusting the calibration of the first accelerometer includes adjusting the calibration of skew and/or rotation of the first accelerometer.

6. The method of claim 1, further comprising adjusting the calibration of the second accelerometer in accordance with the calibrated combined-sensor output.

7. The method of claim 6, wherein:
calibrating the second accelerometer includes calibrating scale and/or offset of the second accelerometer; and
adjusting the calibration of the second accelerometer includes adjusting the calibration of skew and/or rotation of the second accelerometer.

8. The method of claim 6, wherein:
adjusting the calibration of the first accelerometer includes adjusting a respective first-accelerometer conversion value in accordance with a particular combined-sensor conversion value; and
adjusting the calibration of the second accelerometer includes adjusting a respective second-accelerometer conversion value that corresponds to the respective first-accelerometer conversation value in accordance with the particular combined-sensor conversion value.

9. The method of claim 1, wherein the operations of calibrating the first accelerometer, calibrating the second accelerometer and calibrating the combined-sensor output are performed using sensor measurements from a same plurality of sample orientations.

10. The method of claim 9, wherein:
the device includes a magnetometer; and
the method further comprises, calibrating the magnetometer, wherein the magnetometer is calibrated using a set of measurements from a different plurality of sample orientations than the same plurality of sample orientations used to calibrate the accelerometers.

11. The method of claim 1, wherein:
the device includes a magnetometer; and
calibrating the first accelerometer includes:
calibrating the magnetometer;
for each of a plurality of sample orientations:
generating a set of one or more calibrated magnetometer measurements via the magnetometer; and
generating a set of one or more uncalibrated first accelerometer measurements; and
calibrating the first accelerometer using respective calibrated magnetometer measurements and corresponding respective uncalibrated first accelerometer measurements for one or more respective sample orientations of the plurality of sample orientations.

12. A device, comprising:
one or more processors;
a plurality of sensors including a first accelerometer and a second accelerometer;
memory; and one or more programs, wherein the one or more programs are stored in the memory and configured to be executed by the one or more processors, the one or more programs including instructions for:
calibrating the first accelerometer;
calibrating the second accelerometer;
calibrating a combined-sensor output to generate combined-sensor conversion values for converting uncalibrated combined-sensor measurements of the combined-sensor output to calibrated combined-sensor measurements of the combined-sensor output, wherein the combined-sensor output includes contributions from the first accelerometer and the second accelerometer; and
adjusting the calibration of the first accelerometer in accordance with the combined-sensor conversion values.

13. The device of claim 12, wherein:
calibrating the first accelerometer includes calibrating scale and/or offset of the first accelerometer; and
adjusting the calibration of the first accelerometer includes adjusting the calibration of skew and/or rotation of the first accelerometer.

14. The device of claim 12, wherein the one or more programs further comprise instructions for adjusting the calibration of the second accelerometer in accordance with the calibrated combined-sensor output.

15. The device of claim 12, wherein the operations of calibrating the first accelerometer, calibrating the second accelerometer and calibrating the combined-sensor output are performed using sensor measurements from a same plurality of sample orientations.

16. The device of claim 12, wherein:
the device includes a magnetometer; and
calibrating the first accelerometer includes:
  calibrating the magnetometer;
  for each of a plurality of sample orientations:
    generating a set of one or more calibrated magnetometer measurements via the magnetometer; and
    generating a set of one or more uncalibrated first accelerometer measurements; and
  calibrating the first accelerometer using respective calibrated magnetometer measurements and corresponding respective uncalibrated first accelerometer measurements for one or more respective sample orientations of the plurality of sample orientations.

17. A non-transitory computer-readable storage medium storing one or more programs, the one or more programs comprising instructions, which when executed by a computer system with one or more processors, cause the computer system to:
calibrate a first accelerometer;
calibrate a second accelerometer;
calibrate a combined-sensor output to generate combined-sensor conversion values for converting uncalibrated combined-sensor measurements of the combined-sensor output to calibrated combined-sensor measurements of the combined-sensor output, wherein the combined-sensor output includes contributions from the first accelerometer and the second accelerometer; and
adjust the calibration of the first accelerometer in accordance with the combined-sensor conversion values.

18. The non-transitory computer-readable storage medium of claim 17, wherein:
calibrating the first accelerometer includes calibrating scale and/or offset of the first accelerometer; and
adjusting the calibration of the first accelerometer includes adjusting the calibration of skew and/or rotation of the first accelerometer.

19. The non-transitory computer-readable storage medium of claim 17, further comprising instructions to adjust the calibration of the second accelerometer in accordance with the calibrated combined-sensor output.

20. The non-transitory computer-readable storage medium of claim 17, wherein the operations of calibrating the first accelerometer, calibrating the second accelerometer and calibrating the combined sensor output are performed using sensor measurements from a same plurality of sample orientations.

21. The non-transitory computer-readable storage medium of claim 17, wherein:
the device includes a magnetometer; and
calibrating the first accelerometer includes:
  calibrating the magnetometer;
  for each of a plurality of sample orientations:
    generating a set of one or more calibrated magnetometer measurements via the magnetometer; and
    generating a set of one or more uncalibrated first accelerometer measurements; and
  calibrating the first accelerometer using respective calibrated magnetometer measurements and corresponding respective uncalibrated first accelerometer measurements for one or more respective sample orientations of the plurality of sample orientations.

* * * * *